United States Patent
Jimenez et al.

(10) Patent No.: US 11,623,602 B2
(45) Date of Patent: Apr. 11, 2023

(54) OCCUPANT PROTECTION SYSTEM INCLUDING INFLATORS

(71) Applicant: Zoox, Inc., Foster City, CA (US)

(72) Inventors: Josh Alexander Jimenez, San Francisco, CA (US); Markus Jost, San Mateo, CA (US); Andrew John Piper, Palo Alto, CA (US); Andrew Frank Raczkowski, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/473,053

(22) Filed: Sep. 13, 2021

(65) Prior Publication Data

US 2022/0001828 A1 Jan. 6, 2022

Related U.S. Application Data

(63) Continuation of application No. 16/368,663, filed on Mar. 28, 2019, now Pat. No. 11,117,543.

(51) Int. Cl.
*B60R 21/232* (2011.01)
*B60R 21/214* (2011.01)
(Continued)

(52) U.S. Cl.
CPC .......... *B60R 21/232* (2013.01); *B60R 21/214* (2013.01); *B60R 21/2338* (2013.01);
(Continued)

(58) Field of Classification Search
CPC ................ B60R 21/232; B60R 21/214; B60R 21/23138
See application file for complete search history.

(56) References Cited

U.S. PATENT DOCUMENTS 3,774,936 A  11/1973  Barnett et al.
5,470,103 A  11/1995  Vaillancourt et al.
(Continued)

FOREIGN PATENT DOCUMENTS

WO  WO-2008050656 A1 *  5/2008  ....... B60R 21/01538
WO  WO2018132332  7/2018

OTHER PUBLICATIONS

The International Preliminary Report on Patentability for PCT Application No. PCT/US20/24896, dated Oct. 7, 2021, 9 pages.
(Continued)

*Primary Examiner* — Faye M Fleming
(74) *Attorney, Agent, or Firm* — Lee & Hayes, P.C.

(57) ABSTRACT

An occupant protection system for a vehicle may include an expandable curtain and/or an expandable bladder configured to be expanded from a stowed state to a deployed state. The system may also include a transverse ceiling trim panel and one or more side ceiling trim panels configured to be coupled to a ceiling of the vehicle, with the transverse ceiling trim panel extending substantially transversely with respect to the one or more side ceiling trim panels. Portions of the ceiling trim panels may be configured to deflect and allow expansion of the expandable curtain and/or the expandable bladder to the deployed state. The system may also include a deployment controller and one or more inflators configured to cause deployment of the expandable curtain at a first time and deployment of the expandable bladder at a second time after the first time.

18 Claims, 13 Drawing Sheets

(51) Int. Cl.
  *B60R 21/231* (2011.01)
  *B60R 21/2338* (2011.01)
  *B60R 21/26* (2011.01)
  *B60R 21/233* (2006.01)

(52) U.S. Cl.
  CPC .............. *B60R 21/23138* (2013.01); *B60R 2021/23107* (2013.01); *B60R 2021/23161* (2013.01); *B60R 2021/23308* (2013.01); *B60R 2021/26058* (2013.01)

(56) References Cited

U.S. PATENT DOCUMENTS

| | | | |
|---|---|---|---|
| 5,575,497 | A | 11/1996 | Suyama et al. |
| 6,123,355 | A | 9/2000 | Sutherland |
| 7,364,185 | B2 | 4/2008 | Mori et al. |
| 7,762,579 | B2 | 7/2010 | Garner |
| 7,997,615 | B2 | 8/2011 | Jang |
| 8,573,634 | B2 | 11/2013 | Choi et al. |
| 9,321,423 | B2 * | 4/2016 | Jaradi ................... B60R 21/231 |
| 9,327,669 | B2 | 5/2016 | Jaradi et al. |
| 9,446,735 | B1 | 9/2016 | Jayasuriya et al. |
| 9,725,064 | B1 | 8/2017 | Faruque et al. |
| 9,789,840 | B2 | 10/2017 | Farooq et al. |
| 10,246,043 | B2 | 4/2019 | Schneider |
| 10,266,145 | B2 | 4/2019 | Paxton et al. |
| 10,279,770 | B2 | 5/2019 | Faruque et al. |
| 10,315,609 | B2 | 6/2019 | Thomas |
| 10,407,018 | B2 | 9/2019 | Sundararajan et al. |
| 10,471,923 | B2 | 11/2019 | Jimenez et al. |
| 10,589,708 | B2 | 3/2020 | Cho et al. |
| 10,647,286 | B1 | 5/2020 | Dennis et al. |
| 10,688,955 | B2 | 6/2020 | Shin et al. |
| 10,703,323 | B2 | 7/2020 | Jost et al. |
| 11,117,543 | B2 * | 9/2021 | Jimenez ................ B60R 21/232 |
| 2016/0031401 | A1 | 2/2016 | Jaradi et al. |
| 2018/0272985 | A1 | 9/2018 | Nagasawa |
| 2019/0106073 | A1 | 4/2019 | Sundararajan et al. |
| 2019/0193666 | A1 | 6/2019 | Jost et al. |
| 2019/0202391 | A1 | 7/2019 | Cho et al. |
| 2019/0202394 | A1 | 7/2019 | Obayashi et al. |
| 2019/0202395 | A1 * | 7/2019 | Obayashi .............. B60R 21/231 |
| 2019/0381968 | A1 | 12/2019 | Kwon |
| 2020/0307495 | A1 | 10/2020 | Jimenez et al. |
| 2020/0307496 | A1 | 10/2020 | Jimenez et al. |
| 2020/0331419 | A1 | 10/2020 | Jost et al. |

OTHER PUBLICATIONS

Non Final Office Action dated Jun. 25, 2020 for U.S. Appl. No. 16/368,663, "Occupant Protection System Including Inflators", Jimenez, 6 pages.

Non Final Office Action dated Aug. 28, 2020 for U.S. Appl. No. 16/368,603, "Occupant Protection System Including Ceiling Trim Panels", Jimenez, 9 pages.

Final Office Action dated Nov. 30, 2020 for U.S. Appl. No. 16/368,663, "Occupant Protection System Including Inflators", Jimenez, 6 pages.

The PCT Search Report and Written Opinion dated Jun. 9, 2020 for PCT Application No. PCT/JS2020/024896, 12 pages.

* cited by examiner

OCCUPANT PROTECTION SYSTEM INCLUDING INFLATORS

RELATED APPLICATIONS

This application claims priority to and is a continuation of U.S. patent application Ser. No. 16/368,663, filed on Mar. 28, 2019, which will issue as U.S. Pat. No. 11,117,543 on Sep. 14, 2021, the entire contents of which are incorporated herein by reference.

BACKGROUND

Airbags are often used to protect occupants of a vehicle from injury during a collision involving the vehicle. An airbag system may often include an airbag and an inflator for providing the airbag with a gas to inflate the airbag. Upon involvement in a collision, the airbag may be rapidly inflated to create a cushion between the occupant and interior surfaces of the vehicle.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

DETAILED DESCRIPTION

Figure 1:
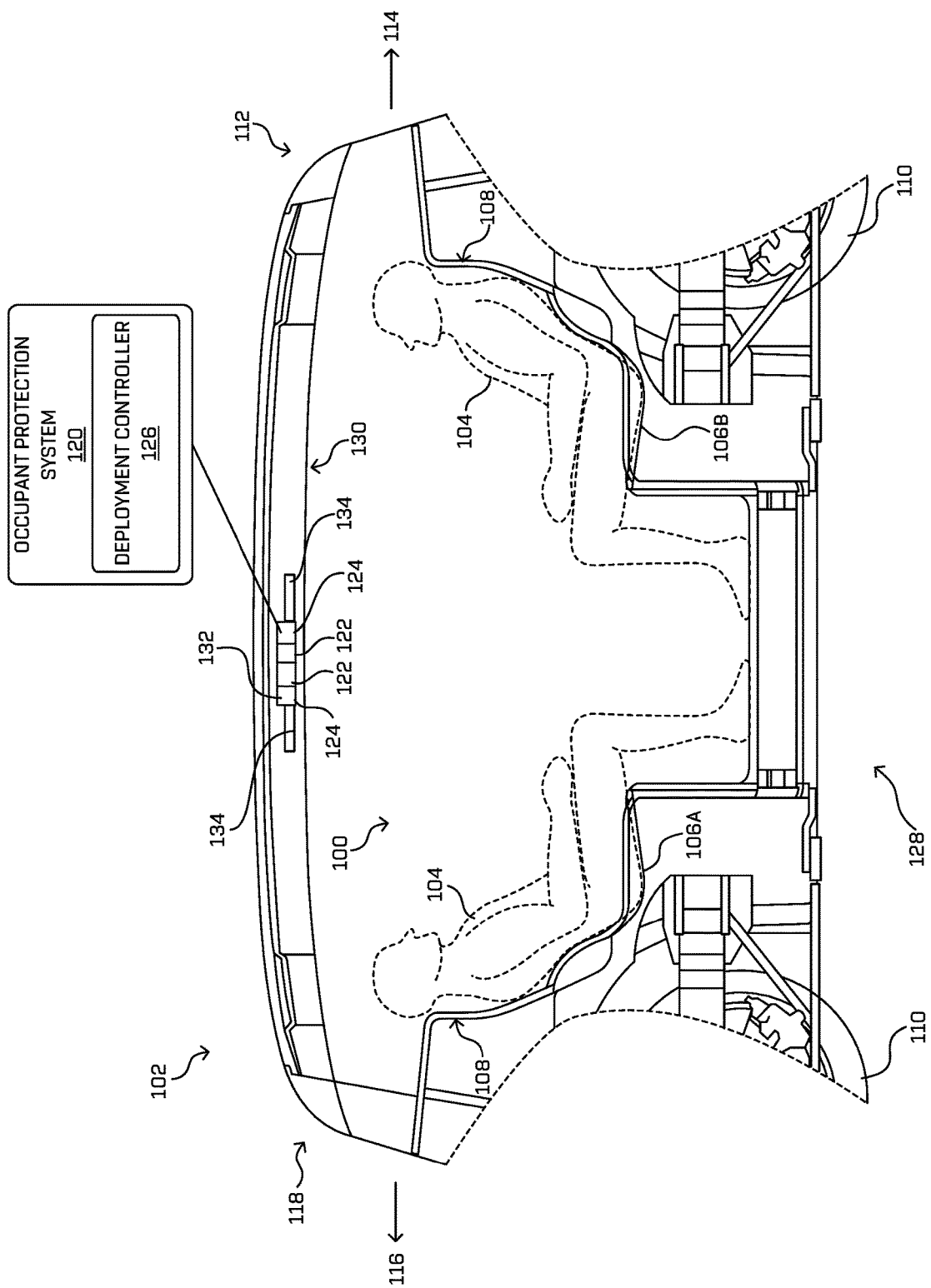
FIG. 1 is a cutaway side view of an example vehicle including an example occupant protection system.

As mentioned above, an airbag may be used to protect an occupant of a vehicle from injury during a collision involving the vehicle. An airbag system may include an airbag and an inflator for providing the airbag with a gas to inflate the airbag. Upon involvement in a collision, the airbag may be rapidly inflated to create a cushion between the occupant and interior surfaces of the vehicle. Different vehicle designs, however, may result in difficulty in protecting an occupant with a conventional airbag. For example, a conventional airbag, once deployed, relies on support from interior structures of the vehicle, such as a steering wheel, dashboard, or an interior panel, to provide the airbag with the ability to stop the movement of the occupant during the collision. Some vehicle designs do not provide such interior structures for all locations at which an occupant may be seated, and thus, a conventional airbag may not effectively protect such occupants. For example, in a vehicle having carriage-style seating with passengers facing each other toward a center of the vehicle, there may be limited or no structure directly in front of occupants of the vehicle. In addition, the components of an airbag system occupy space inside the vehicle and add weight to the vehicle, and it may be difficult to install the components of an airbag system in a location of the interior of the vehicle that permits the airbag to deploy at a rate sufficient to protect the occupant and/or with sufficient dimensions to protect the occupant. In addition, it may be difficult to quickly and effectively deploy airbags hidden from view under interior panels of the vehicle. Some embodiments disclosed herein may address or mitigate at least some of the above-noted drawbacks.

This disclosure is generally directed to apparatuses, systems, and methods for deploying an occupant protection system in a vehicle, such as, but not limited to, a vehicle having a carriage-style seating arrangement. For instance, a carriage-style seating arrangement may include multiple seats spaced apart from one another and facing one another in a passenger compartment of the vehicle. In such an example, a central region of the passenger compartment disposed between the seats may be open space substantially free of interior structures. The occupant protection system may include an expandable curtain and/or an expandable bladder configured to arrest the motion of an occupant during a collision involving the vehicle. The expandable curtain may be deployed to provide a reaction surface within the passenger compartment against which objects, occupants, and/or an expandable bladder may contact. For example, an expandable bladder may include an occupant facing surface and a rear surface, and the rear surface may be supported by the reaction surface provided by the expandable curtain, for example, to assist with arresting the motion of an occupant during a collision. In some examples, the expandable curtain may include a transverse portion including the reaction surface and extending transversely at least partially across the interior of the vehicle, and first and second opposing sides spaced from one another and extending orthogonally with respect to the transverse portion. In some such examples, a ceiling trim system may be provided and may include ceiling trim panels configured to deflect upon deployment of the expandable curtain, such that one or more openings are created through which the transverse portion and first and second sides of the expandable curtain may deploy.

In some examples, one or more inflators may be provided to cause deployment of one or more expandable curtains and/or one or more expandable bladders. In some examples, a first inflator may be activated at a first time to deploy at least a portion of at least one expandable curtain, and a second inflator may be activated at a second time following the first time to deploy at least one expandable bladder. In some such examples, the first inflator may have a capacity sufficient to deflect one or more of the ceiling trim panels, so that the one or more expandable curtains and/or one or more expandable bladders may deploy through one or more openings created by deflection of the ceiling trim panels.

For example, an occupant protection system for a vehicle may include an expandable curtain configured to expand from a stowed state to a deployed state having a length configured to extend at least a portion of a distance between a vehicle roof and a vehicle floor. The expandable curtain in the deployed state may include a first side configured to extend along a portion of a first interior side of the vehicle in a first direction, and a second side spaced from the first side and configured to extend in a direction substantially parallel to the first direction. The expandable curtain in the deployed state may also include a transverse portion extending in a second direction transverse to the first direction. The transverse portion may be configured to provide a reaction surface, and the first side, the transverse portion, and the second side of the expandable curtain may form a contiguous barrier. The occupant protection system may also include an expandable bladder including an occupant facing surface and a rear surface opposite the occupant facing surface. The expandable bladder may be configured to expand from a stowed state to a deployed state, such that in the deployed state the rear surface of the expandable bladder contacts the reaction surface of the transverse portion. The occupant protection system may also include a transverse ceiling trim panel configured to be coupled to a ceiling of the vehicle and extending substantially parallel to the second direction. The transverse ceiling trim panel may be configured to cover the transverse portion of the expandable curtain in the stowed state and deflect to allow expansion of the transverse portion to the deployed state. The occupant protection system may also include a first side ceiling trim panel configured to be coupled to the ceiling of the vehicle and extending substantially parallel to the first direction. The first side ceiling trim panel may be configured to cover the first side of the expandable curtain in the stowed state and deflect to allow expansion of the first side to the deployed state. In some examples, the occupant protection system may also include a second side ceiling trim panel configured to be coupled to the ceiling of the vehicle and extending substantially parallel to the first direction. The second side ceiling trim panel may be configured to cover the second side of the expandable curtain in the stowed state and deflect to allow expansion of the second side to the deployed state. In some examples, the first side ceiling trim panel, the transverse ceiling trim panel, and the second side ceiling trim panel may be configured to deflect and form a substantially continuous opening through which the first side of the expandable curtain, the transverse portion of the expandable curtain, and the second side of the expandable curtain may deploy.

In some examples, the transverse ceiling trim panel may define a transverse seam extending substantially parallel to the second direction, and the transverse seam may be configured to create a transverse opening through which the transverse portion of the expandable curtain passes when expanding from the stowed state to the deployed state. A "seam" may be defined by one or more respective edges of a trim panel, for example, where the respective edge meets a portion of the vehicle, and/or a "seam" may be defined by an area of weakness created in a trim panel, for example, a line of reduced material thickness, a line scored on a surface of the trim panel, and/or a line of perforations in the trim panel. In some examples, the transverse ceiling trim panel may include a living hinge, for example, spaced from the seam to facilitate deflection of the transverse ceiling trim panel.

In some examples, the first side ceiling trim panel may define a longitudinal seam extending substantially parallel to the first direction, and the longitudinal seam may be configured to create a longitudinal opening through which the first side of the expandable curtain passes when expanding from the stowed state to the deployed state. The second side ceiling trim panel, in some examples, may define a longitudinal seam extending substantially parallel to the first direction, and the longitudinal seam may be configured to create a longitudinal opening through which the second side of the expandable curtain passes when expanding from the stowed state to the deployed state. In some examples, the first side ceiling trim panel may include a living hinge, for example, spaced from the seam to facilitate deflection of the first side ceiling trim panel.

In some examples, the occupant protection system may also include a first inflator in flow communication with the expandable curtain and configured to cause, upon activation of the first inflator, the expandable curtain to expand from the stowed state to the deployed state. The occupant protection system, in some examples, may also include a second inflator in flow communication with the expandable bladder and configured to cause, upon activation of the second inflator, the expandable bladder to expand from the stowed state to the deployed state. In some examples, the occupant protection system may also include a deployment controller in communication with the first inflator and the second inflator and configured to activate the first inflator and the second inflator. The deployment controller, in some examples, may be configured to activate the first inflator sequentially prior to activation of the second inflator. In some such examples, the first inflator may have a capacity sufficient to cause one or more of the ceiling trim panels to deflect and create an opening through which at least a portion of at least one of the expandable curtain or the expandable bladder may deploy.

In some examples of the occupant protection system, the first inflator may include two or more inflators (e.g., three inflators) configured to deploy the first side of the expandable curtain, the transverse portion of the expandable curtain, and the second side of the expandable curtain. Some examples of the occupant protection system (e.g., for a vehicle having carriage-style seating) may include a second expandable curtain, and the first inflator may be configured to deploy the first expandable curtain and the second expandable curtain. Some examples may include two or more inflators (e.g., two, three, four, etc.) configured to deploy the first expandable curtain and the second expandable curtain. In some examples, the first expandable curtain and the second expandable curtain may be deployed together, either via a common inflator or via two or more separate inflators, and/or in some examples, the first expandable curtain and the second expandable curtain may be deployed independently of one another, for example, such that one of the first expandable curtain or the second expandable curtain is deployed, and the other of the first expandable curtain or the second expandable curtain remains in the stowed state.

Some examples of the occupant protection system may include more than one expandable bladder, for example, an expandable bladder corresponding to each seat or each passenger location of the vehicle. In some such examples, a single inflator may be configured to deploy all of the expandable bladders together. In some examples, a single inflator may be configured to deploy two or more expandable bladders together. For example, a single inflator may be configured to deploy two or more expandable bladders associated with a common expandable curtain. In other examples, an inflator may be provided for each of the expandable bladders, and the inflators may be activated together at a single time, or the inflators may be activated independently of one another at a single time or at different times.

The techniques and systems described herein may be implemented in a number of ways. Example implementations are provided below with reference to the figures.

FIG. 1 is a side cutaway view of showing an interior 100 of an example vehicle 102 including a pair of occupants 104. The example vehicle 102 may be configured to travel via a road network from one geographic location to a destination carrying one or more of the occupants 104. For example, the interior 100 may include a plurality of seats 106, which may be provided in any relative arrangement. The example vehicle 102 shown in FIG. 1 includes an example carriage-style seating arrangement in a substantially central portion of the interior 100 of the vehicle 102. For example, the vehicle 102 may include two or more rows 108 of seats 106, and in some examples, two of the rows 108 of seats 106 may face each other, for example, as shown in FIG. 1. One or more of the rows 108 of the seats 106 may include two seats 106 (e.g., seats 106A and 106B). Other relative arrangements and numbers of seats 106 are contemplated.

For the purpose of illustration, the vehicle 102 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 102 may be configured to control all functions from start to completion of the trip, including all parking functions, it may not include a driver and/or controls for driving the vehicle 102, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially- or fully-autonomously controlled.

The example vehicle 102 may be any configuration of vehicle, such as, for example, a van, a sport utility vehicle, a cross-over vehicle, a truck, a bus, an agricultural vehicle, and a construction vehicle. The vehicle 102 may be powered by one or more internal combustion engines, one or more electric motors, hydrogen power, any combination thereof, and/or any other suitable power sources. Although the example vehicle 102 has four wheels 110, the systems and methods described herein may be incorporated into vehicles having fewer or a greater number of wheels, tires, and/or tracks. The example vehicle 102 may have four-wheel steering and may operate generally with equal performance characteristics in all directions, for example, such that a first end 112 of the vehicle 102 is the front end of the vehicle 102 when travelling in a first direction 114, and such that the first end 112 becomes the rear end of the vehicle 102 when traveling in the opposite, second direction 116, as shown in FIG. 1. Similarly, a second end 118 of the vehicle 102 is the front end of the vehicle 102 when travelling in the second direction 116, and such that the second end 118 becomes the rear end of the vehicle 102 when traveling in the opposite, first direction 114. These example characteristics may facilitate greater maneuverability, for example, in small spaces or crowded environments, such as parking lots and urban areas.

As shown in FIG. 1, the vehicle 102 may include an occupant protection system 120 configured to protect one or more of the occupants 104 during a collision involving the vehicle 102. For example, the occupant protection system 120 may include one or more of an expandable curtain 122, one or more expandable bladders 124, and a deployment controller 126 configured to control deployment of one or more of the expandable curtains 122 and one or more of the expandable bladders 124, so that they deploy from a stowed state, for example, as shown in FIG. 1, to a deployed state, for example, as shown in FIGS. 2 and 4-6B. In some examples, the occupant protection system 120 may also include a seatbelt system that includes a seatbelt for each of one or more of the occupants 104, for example, as explained in more detail herein. The expandable curtain(s) 122 and/or the expandable bladder(s) 124 may be formed from, for example, a woven nylon fabric and/or other similar materials, or materials having suitable characteristics.

As shown in FIG. 1, the example vehicle 102 includes a chassis 128 including a vehicle roof 130 having a housing 132 configured to receive the expandable curtain(s) 122 and/or the expandable bladder(s) 124, each in the stowed (e.g., unexpanded state). In some examples, the expandable curtain(s) 122 and/or expandable bladder(s) 124 may be stored individually in separate housings. In some examples (e.g., those examples where portions of the expandable curtain(s) are separate from one another), each portion may be stored individually in separate housings. In some examples, upon receipt of one or more signals from the vehicle 102, the deployment controller 126 may be configured to activate one or more inflators 134 in flow communication with the expandable curtain(s) 122 and/or the expandable bladder(s) 124, such that the inflators 134 provide a fluid or gas to the expandable curtain(s) 122 and/or expandable bladder(s) 124, so that that the expandable curtain(s) 122 and/or the expandable bladder(s) 124 may rapidly expand from their stowed state (FIG. 1) to their respective deployed states, for example, as shown in FIGS. 2 and 4-6B. For example, the inflators 134 may include a gas generator, a pyrotechnic charge, propellants, any combination thereof, and/or any other suitable devices or systems. The expandable curtain(s) 122 and/or expandable bladder(s) 124 may be configured to deploy in, for example, less than 100 milliseconds or less than 50 milliseconds. As explained herein, the expandable curtain(s) 122 and/or the expandable bladder(s) 124, in the deployed state, may protect an occupant 104 from injury (or reduce its likelihood or severity) during a collision involving the vehicle 102 by providing a cushion between the occupant 104 and interior structures of the vehicle 102, so that the occupant 104 will be prevented from being thrown into the interior structures and/or, in some instances, being ejected from the vehicle 102.

Figure 2:
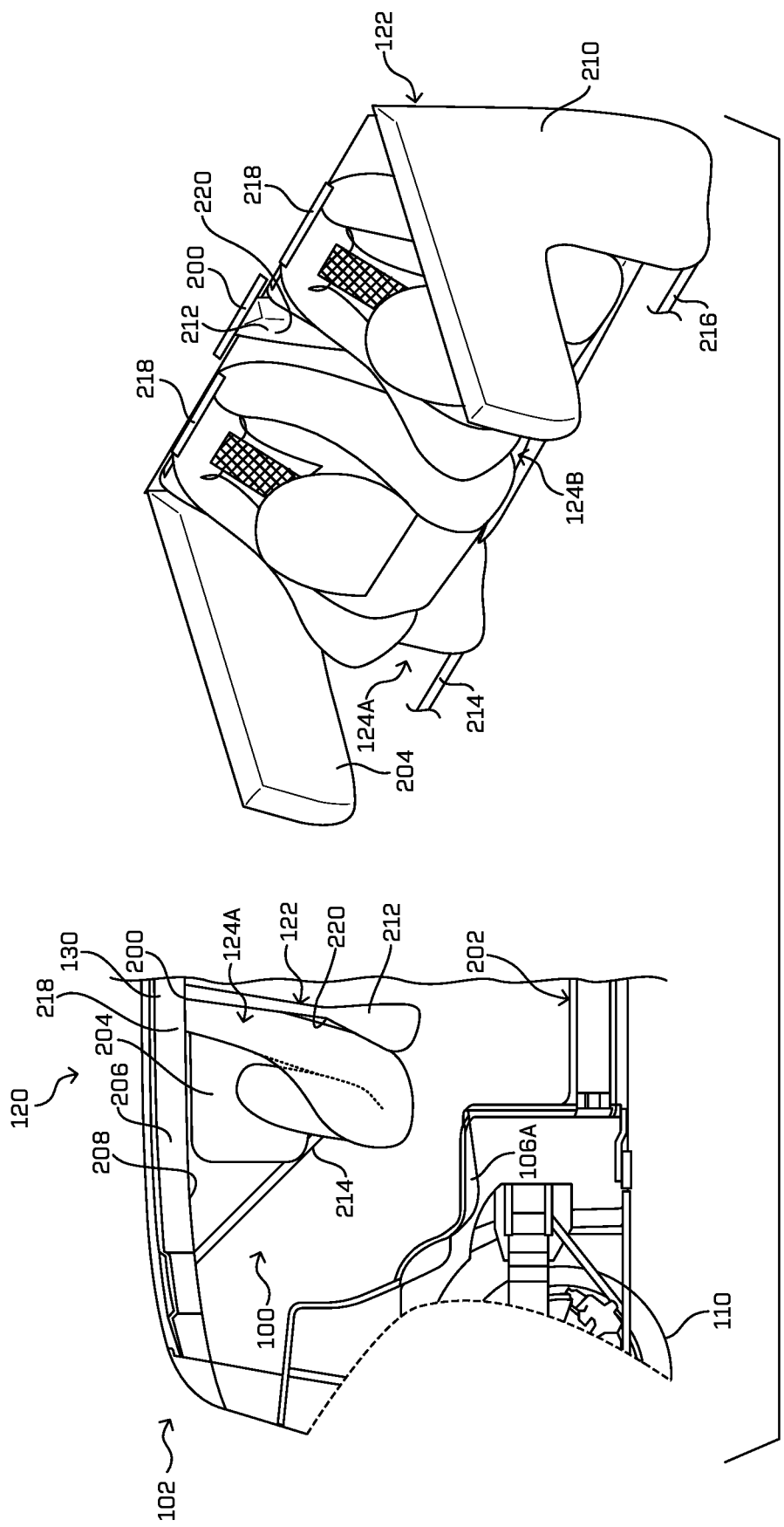
FIG. 2 is a partial side view of the example vehicle shown in FIG. 1 with an example expandable curtain and an example expandable bladder shown in a deployed state.

FIG. 2 shows an example occupant protection system 120 with an example expandable curtain 122 and an example first expandable bladder 124A and an example second expandable bladder 124B in a deployed (e.g., expanded) state, with occupants omitted for clarity. In the example shown, the expandable curtain 122 has been deployed from the vehicle roof 130 and is coupled to the vehicle roof 130 at an attachment point 200. In some examples, the expandable curtain 122 may be indirectly coupled to and supported by the vehicle roof 130, for example, via an intermediate coupling.

The example expandable curtain 122 may be configured to be expanded from a stowed state, for example, as shown in FIG. 1, to a deployed state, for example, as shown in FIG. 2, having a length configured to extend at least a portion of the distance between the vehicle roof 130 and a vehicle floor 202. As shown, in some examples, the expandable curtain 122 extends toward the vehicle floor 202 and terminates at a location spaced above the vehicle floor 202. In some examples, the expandable curtain 122 may extend to and terminate at the vehicle floor 202. In the example shown, the expandable curtain 122 in the deployed state may include first side 204 configured to extend along a portion of a first interior side 206 of the vehicle 102. For example, the first side 204 of the expandable curtain 122 may extend in a longitudinal direction substantially parallel to the first interior side 206 of the vehicle 102. In some examples, the first side 204 of the expandable curtain 122 may be deployed from a housing located above the opening 208 in the first interior side 206 and or from the vehicle roof 130. In some examples, the first side 204 of the expandable curtain 122 may be inflatable and may be configured to provide cushioning between the occupant 104 and the first interior side 206 of the vehicle 102.

In some examples, the expandable curtain 122 may also include a second side 210 spaced from and opposite the first side 204 and configured to extend along a portion of a second interior side of the vehicle 102 (not shown in FIG. 2 due to limitations of the view provided). The first and second interior sides of the vehicle 102 may be on opposite sides of the vehicle 102 and may extend substantially parallel to one another. In some examples, the second side 210 of the expandable curtain 122 may have structural, location, stowage, and/or deployment characteristics similar to, or the same as, the first side 204 of the expandable curtain 122, except that it may be located on the second interior side of the vehicle 102 and may be different to accommodate differences with being on the second interior side of the vehicle 102 instead of the first interior side 206.

As shown in FIG. 2, the example expandable curtain 122 also includes a transverse portion 212 extending between the first side 204 and the second side 210 of the expandable curtain 122. In some examples, the first side 204, the second side 210, and the transverse portion 212 of the expandable curtain 122 form a contiguous barrier. For example, the first side 204, the second side 210, and the transverse portion 212 of the expandable curtain 122 may define a substantially U-shaped cross-sectional area as created by a plane normal to its length. In some examples, the first side 204, the second side 210, and the transverse portion 212 of the expandable curtain 122 form a continuous barrier. In some examples, one or more of the first side 204, the second side 210, or the transverse portion 212 of the expandable curtain 122 may include an additional expandable portion (e.g., a channel) located adjacent the vehicle roof 130. The one or more additional expandable portions may assist the deployment of the first side 204, second side 210, and/or transverse portion 212 from the housing 132 upon initiation of the deployment of the expandable curtain 122. For example, the one or more additional expandable portions may assist with forcing open portions of the interior trim of the vehicle 102 configured to permit the expandable curtain to deploy from underneath the trim, for example, as described herein with respect to FIGS. 7-11C. In some examples, the first side 204, the second side 210, and/or the transverse portion 212 of the expandable curtain 122 may not form a continuous barrier or sheet, for example, such that the transverse portion 212 includes material for forming the reaction surfaces, and includes cut-outs at other portions of the transverse portion 212.

In some examples, the occupant protection system 120 may include a first tether 214 coupled to the first side 204 and/or transverse portion 212 of the expandable curtain 122 and coupled to a portion of the vehicle 102, such as, for example, a portion associated with (e.g., directly or indirectly coupled to) the first interior side 206 (e.g., an interior panel or a structural member of the vehicle chassis 128) the vehicle floor 202, or the vehicle roof 130 of the vehicle 102, for example, as shown in FIG. 2. For example, the first tether 214 may at one end be coupled to a free edge of the first side 204 of the expandable curtain 122, and at a second end coupled to an anchor associated with the first interior side 206 of the vehicle 102 and/or the vehicle roof 130. The occupant protection system 120 may also include a second tether 216 coupled to the second side 210 and/or transverse portion 212 of the expandable curtain 122 and configured to be coupled to a portion of the vehicle 102, such as, for example, a portion associated with (e.g., directly or indirectly coupled to) the second interior side, the vehicle floor 202, or the vehicle roof 130 of the vehicle 102, for example, in manner at least similar to the first tether 214. In some examples, the first and second tethers 214 and 216 may assist with preventing the expandable curtain 122, once deployed, from swinging in a direction away from the occupant 104 during the collision, for example, as the occupant 104 contacts the expandable curtain 122, either directly or indirectly, as explained herein.

In the example shown in FIG. 2, the expandable bladders 124A and 124B have been deployed from the vehicle roof 130 and are coupled to the vehicle roof 130 at an attachment point 218. For example, the expandable bladders 124A and 124B shown in FIG. 2 have expanded from a stowed state to a deployed state, and are associated with (e.g., directly or indirectly coupled to) the transverse portion 212 of the expandable curtain 122, for example, such that the expandable curtain 122 may support the expandable bladders 124A and 124B when an occupant 104 contacts one of the expandable bladders 124A or 124B as the occupant 104 is urged forward in the direction toward which the seat 106 is facing and into the expandable bladders 124A and 124B (i.e., from left-to-right as shown in FIG. 2). For example, the transverse portion 212 of the expandable curtain 122 includes a support face side 220 creating a reaction surface facing the seat 106 and the expandable bladders 124A and 124B, and as the occupant 104 contacts one of the expandable bladders 124A or 124B, the expandable bladder 124A or 124B presses against the support face side 220 of the expandable curtain 122. The expandable curtain 122 is suspended from the vehicle roof 130 (or adjacent thereto) at the attachment point 200 and is supported by the first and/or second tethers 214 and 216, which prevent the expandable curtain 122 from swinging freely about the attachment point 200 forward in the direction in which the seat 106 is facing and the direction in which the occupant 104 is moving during a collision. In this example manner, the occupant protection system 120 may protect the occupant 104 during a collision involving the vehicle 102, for example, by preventing the occupant 104 from colliding in an un-cushioned or unprotected manner with interior structures of the vehicle 102 and/or, in some instances, preventing the occupant 104 from being ejected from the vehicle 102.

In the example shown in FIG. 2, at least a portion of the first side 204 of the expandable curtain 122 and at least a portion of the second side 210 of the expandable curtain 122 extend away from the support face side 220 of the of the transverse portion 212 of the expandable curtain 122. In some examples, one or more of the expandable bladders 124A or 124B may be associated with (e.g., directly or indirectly coupled to) the support face side 220 of the transverse portion 212 and may be located between the first side 204 and the second side 210 of the expandable curtain 122, for example, as shown in FIG. 2.

The first expandable bladder 124A and/or second expandable bladder 124B may each be configured to expand from a stowed state to a deployed state associated with the transverse portion 212 of the expandable curtain 122, for example, as shown in FIG. 2. In some examples, the first expandable bladder 124A and/or the second expandable bladder 124B may be coupled to the transverse portion 212 of the expandable curtain 122. In some examples, the first expandable bladder 124A and/or the second expandable bladder 124B may not be coupled to the transverse portion 212 of the expandable curtain 122. For example, the first and/or second expandable bladder may be coupled, directly or indirectly, to the vehicle roof 130 independently of one another and/or independently of the expandable curtain 122.

In some examples, the first side 204, the second side 210, and/or the transverse portion 212 of the expandable curtain 122 may be configured such that when the expandable curtain 122 is deployed, the lower edge of the transverse portion 212 is closer to the seat 106 toward which the first side 204 and second side 210 extend than the upper portion of the transverse portion 212, thereby resulting in the transverse portion 212 extending downward toward the floor of the vehicle 102 and creating an angle relative to vertical, for example, as shown in FIG. 2. This angle may be created by a contraction of the first side 204 and/or the second side 210 as the expandable curtain 122 is deployed. This example configuration results the lower edge of the expandable curtain 122 being closer to the lower portion of the chest an occupant in the seat 106 than an upper portion of the chest and/or head of the occupant upon deployment. This creates a reaction surface against which the first and/or second expandable bladders 124A and 124B may react and which results in arresting the lower portion of the chest of the occupant and allowing the upper chest and/or head of the occupant to continue forward and pivot downward into/against one of the expandable bladders 124 as the occupant is arrested by the expandable bladder 124, for example, as described herein with respect to FIGS. 6A and 6B.

In some examples, the deployment controller 126 (FIG. 1) may be configured to cause the one or more of the first expandable bladder 124A, the second expandable bladder 124B, or the expandable curtain 122 to expand from the stowed state to the deployed state, for example, by activating one or more inflators 134 (FIG. 1) associated with (e.g., in flow communication with) one or more of the first expandable bladder 124A, the second expandable bladder 124B, or the expandable curtain 122, for example, as described herein with respect to FIGS. 7-11C. The first expandable bladder 124A, the second expandable bladder 124B, and the expandable curtain 122 may be deployed together, concurrently (e.g., substantially simultaneously), or may be deployed independently of one another. For example, the deployment controller 126 may be configured to cause the expandable curtain 122 to deploy and/or expand from the stowed state to the deployed state at a first time, and thereafter cause the first expandable bladder 124A and/or the second expandable bladder 124B to expand from the stowed state to the deployed state at a second time following the first time. In some examples, the first expandable bladder 124A or the second expandable bladder 124B may be deployed individually, for example, without necessarily deploying the other of the expandable bladders. By deploying the expandable curtain 122 and/or the expandable bladders 124A or 124B independently, the packaging of the occupant protection system 120 may be improved by, for example, reducing the size of gas generators associated with (e.g., that may form part of) the inflator(s) 134 and/or the housing(s) 132 used to contain the undeployed first and second expandable bladders 124A and 124B and expandable curtain 122. Additionally, or alternatively, by deploying the expandable curtain 122 and/or the expandable bladders 124A or 124B independently, replacement costs may be minimized, as only those members deployed would need replacing or refurbishing.

The example vehicle 102 shown in FIGS. 1 and 2 may include a first seat 106A coupled to a portion the vehicle 102 and facing the first direction 114 relative to a longitudinal axis of the vehicle 102, and the vehicle 102 may also include a second seat 106B (FIG. 1) coupled to a portion the vehicle 102 and facing the second direction 116 opposite the first direction 114. In some examples of the occupant protection system 120, the first side 204 of the expandable curtain 122 and the second side 210 of the expandable curtain 122 may extend from the transverse portion 212 of the expandable curtain 122 in the second direction 116 toward the first seat 106A. The first expandable bladder 124A may be configured to deploy between the transverse portion 212 of the expandable curtain 122 and the first seat 106A.

Figure 3:
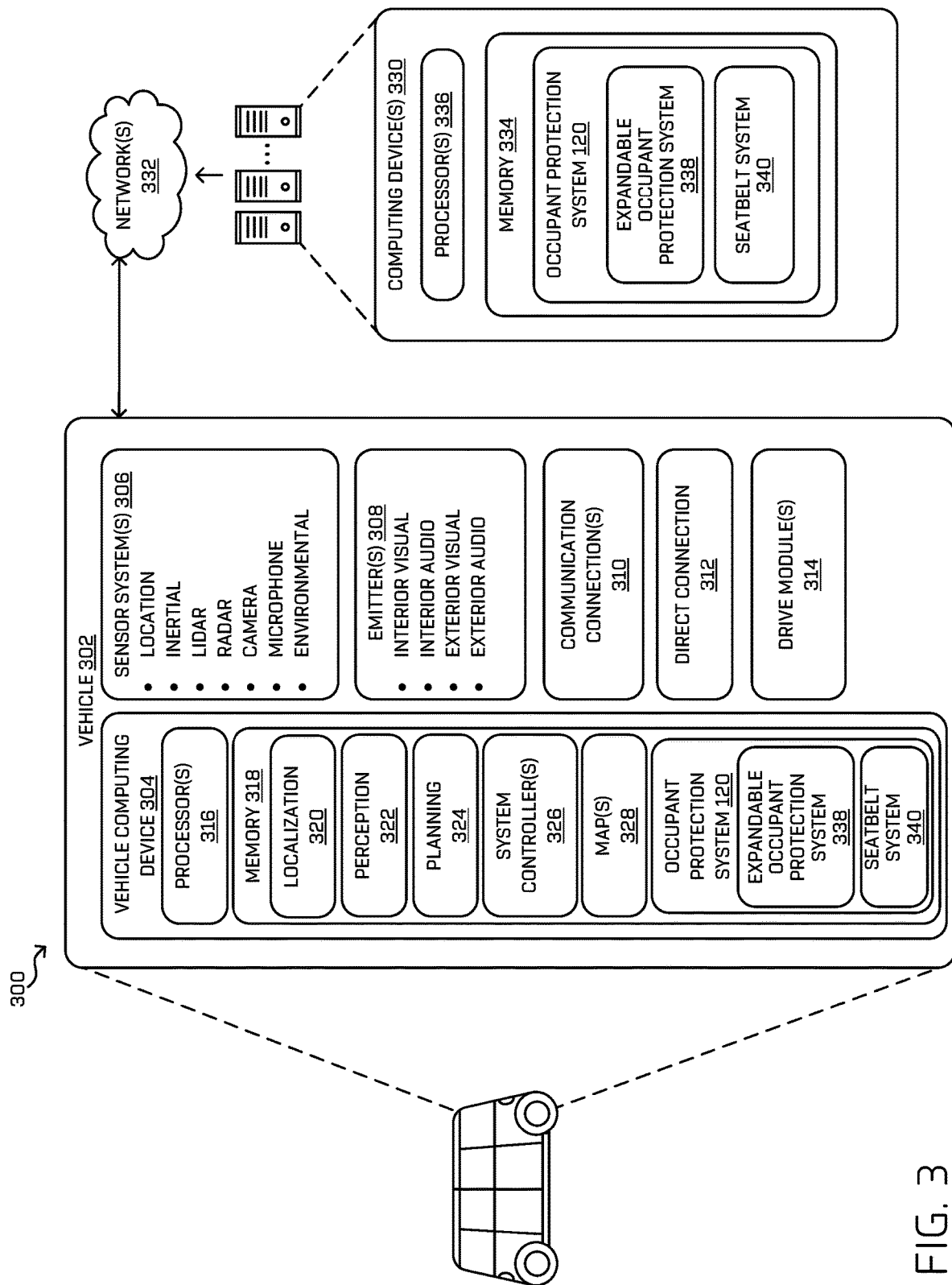
FIG. 3 is a block diagram of an example system for implementing the techniques described herein.

FIG. 3 depicts a block diagram of an example architecture 300 for implementing the techniques described herein. In at least some examples, the architecture 300 may include a vehicle 302, which may correspond to the example vehicle 102 shown in FIGS. 1 and 2. The vehicle 302 may include a vehicle computing device 304, one or more sensor systems 306, one or more emitters 308, one or more communication connections 310, at least one direct connection 312, and one or more drive modules 314.

The vehicle computing device 304 may include one or more processors 316 and memory 318 communicatively coupled with the one or more processors 316. In the illustrated example, the vehicle 302 is an autonomous vehicle. However, the vehicle 302 may be any other type of vehicle. In the illustrated example, the memory 318 of the vehicle computing device 304 stores a localization component 320, a perception component 322, a planning component 324, one or more system controllers 326, one or more map(s) 328, and an example occupant protection system 120. Though depicted in FIG. 3 as residing in memory 318 for illustrative purposes, it is contemplated that the localization component 320, the perception component 322, the planning component 324, the one or more system controllers 326, the one or more maps 328, and the occupant protection system 120 may additionally, or alternatively, be accessible to the vehicle 302 (e.g., stored on, or otherwise accessible by, memory remote from the vehicle 302).

In at least one example, the localization component 320 may be configured to receive data from the sensor system(s) 306 to determine a position and/or orientation of the vehicle 302 (e.g., one or more of an x-, y-, z-position, roll, pitch, or yaw). For example, the localization component 320 may include and/or request/receive a map of an environment and may continuously determine a location and/or orientation of the autonomous vehicle within the map. In some examples, the localization component 320 may utilize SLAM (simultaneous localization and mapping), CLAMS (calibration, localization and mapping, simultaneously), relative SLAM, bundle adjustment, non-linear least squares optimization, or the like to receive image data, LIDAR sensor data, radar data, IMU data, GPS data, wheel encoder data, and the like to accurately determine a location of the autonomous vehicle. In some examples, the localization component 320 may provide data to various components of the vehicle 302 to determine an initial position of an autonomous vehicle for generating a candidate trajectory, as discussed herein.

In some examples, the perception component 322 may be configured to perform object detection, segmentation, and/or classification. In some examples, the perception component 322 may provide processed sensor data that indicates a presence of an entity that is proximate to the vehicle 302 and/or a classification of the entity as an entity type (e.g., car, pedestrian, cyclist, animal, building, tree, road surface, curb, sidewalk, unknown, etc.). In additional and/or alternative examples, the perception component 322 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

In general, the planning component 324 may determine a path for the vehicle 302 to follow to traverse through an environment. For example, the planning component 324 may determine various routes and trajectories and various levels of detail. For example, the planning component 324 may determine a route to travel from a first location (e.g., a current location) to a second location (e.g., a target location). For the purpose of this discussion, a route may be a sequence of waypoints for travelling between two locations. As non-limiting examples, waypoints include streets, intersections, global positioning system (GPS) coordinates, etc. Further, the planning component 324 may generate an instruction for guiding the autonomous vehicle along at least a portion of the route from the first location to the second location. In at least one example, the planning component 324 may determine how to guide the autonomous vehicle from a first waypoint in the sequence of waypoints to a second waypoint in the sequence of waypoints. In some examples, the instruction may be a trajectory or a portion of a trajectory. In some examples, multiple trajectories may be substantially simultaneously generated (e.g., within technical tolerances) in accordance with a receding horizon technique, wherein one of the multiple trajectories is selected for the vehicle 302 to navigate.

In at least one example, the planning component 324 may determine a location of a user based on image data of an environment received from the user using, for example, bags of binary words with image-based features, artificial neural network, and the like. Further, the planning component 324 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 302 may stop to pick up a passenger. In at least one example, the planning component 324 may determine a pickup location based at least in part on determining a user identity (e.g., determined via image recognition or received as an indication from a user device, as discussed herein).

In at least one example, the vehicle computing device 304 may include one or more system controllers 326, which may be configured to control steering, propulsion, braking, safety, emitters, communication, and other systems of the vehicle 302. These system controller(s) 326 may communicate with and/or control corresponding systems of the drive module(s) 314 and/or other components of the vehicle 302.

The memory 318 may further include one or more map(s) 328 that may be used by the vehicle 302 to navigate within the environment. For the purpose of this application, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the map may be stored in a tiled format, such that individual tiles of the map represent a discrete portion of an environment and may be loaded into working memory as needed. In at least one example, the one or more maps 328 may include at least one map (e.g., images and/or a mesh). In some examples, the vehicle 302 may be controlled based at least in part on the maps 328. That is, the maps 328 may be used in connection with the localization component 320, the perception component 322, and/or the planning component 324 to determine a location of the vehicle 302, identify objects in an environment, and/or generate routes and/or trajectories to navigate within an environment.

In some examples, the one or more maps 328 may be stored on a remote computing device(s) (such as computing device(s) 330) accessible via one or more network(s) 332. In some examples, multiple maps 328 may be stored based on, for example, a characteristic (e.g., type of entity, time of day, day of week, season of the year, etc.). Storing multiple maps 328 may have similar memory requirements but increase the speed at which data in a map may be accessed.

As shown in FIG. 3, in some examples, the occupant protection system 120 may be stored in the memory 318 of the computing device 304 of the vehicle 302 or remote from the vehicle 302 in the memory 334 of the computing device(s) 330. In some examples, some portions of the occupant protection system 120 may be stored in the memory 318 of the computing device 304 of the vehicle 302, and other portions of the occupant protection system 120 may be stored remotely in the memory 334 of the computing device(s) 330, and the separately located portions of the occupant protection system 120 may operate together in a coordinated manner.

In some examples, aspects of some or all of the components discussed herein may include any models, algorithms, and/or machine learning algorithms. For example, in some examples, the components in the memory 318 and/or the memory 334 may be implemented as a neural network.

As described herein, an exemplary neural network is a biologically inspired algorithm which passes input data through a series of connected layers to produce an output. Each layer in a neural network may also include another neural network or may include any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks, such as, for example, ResNet70, ResNet101, VGG, DenseNet, PointNet, and the like.

In at least one example, the sensor system(s) 306 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time-of-flight (TOF), etc.), microphones, wheel encoders, environment sensors (e.g., temperature sensors, humidity sensors, light sensors, pressure sensors, etc.), etc. The sensor system(s) 306 may include multiple examples of each of these or other types of sensors. For example, the LIDAR sensors may include individual LIDAR sensors located at the corners, front, back, sides, and/or top of the vehicle 302. As another example, the camera sensors may include multiple cameras disposed at various locations about the exterior and/or interior of the vehicle 302. The sensor system(s) 306 may provide input to the vehicle computing device 304. Additionally, or alternatively, the sensor system(s) 306 may send sensor data, via the one or more networks 332, to the one or more computing device(s) 330 at a particular frequency, after a lapse of a predetermined period of time, in near real-time, etc.

The vehicle 302 may also include one or more emitters 308 for emitting light and/or sound, as described above. The emitters 308 in this example include interior audio and visual emitters to communicate with passengers of the vehicle 302. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 308 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which including acoustic beam steering technology.

The vehicle 302 may also include one or more communication connection(s) 310 that enable communication between the vehicle 302 and one or more other local or remote computing device(s). For example, the communication connection(s) 310 may facilitate communication with other local computing device(s) on the vehicle 302 and/or the drive module(s) 314. Also, the communication connection(s) 310 may allow the vehicle 302 to communicate with other nearby computing device(s) (e.g., other nearby vehicles, traffic signals, etc.). The communications connection(s) 310 also enable the vehicle 302 to communicate with a remote teleoperations computing device or other remote services.

The communications connection(s) 310 may include physical and/or logical interfaces for connecting the vehicle computing device 304 to another computing device or a network, such as network(s) 332. For example, the communications connection(s) 310 may enable Wi-Fi-based communication, such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 302 may include one or more drive modules 314. In some examples, the vehicle 302 may have a single drive module 314. In at least one example, if the vehicle 302 has multiple drive modules 314, individual drive modules 314 may be positioned on opposite ends of the vehicle 302 (e.g., the front and the rear, etc.). In at least one example, the drive module(s) 314 may include one or more sensor systems to detect conditions of the drive module(s) 314 and/or the surroundings of the vehicle 302. By way of example and not limitation, the sensor system(s) 306 may include one or more wheel encoders (e.g., rotary encoders) to sense rotation of the wheels (e.g., wheels 110, FIG. 2) of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders may be unique to the drive module(s) 314. In some cases, the sensor system(s) on the drive module(s) 314 may overlap or supplement corresponding systems of the vehicle 302 (e.g., sensor system(s) 306).

The drive module(s) 314 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 314 may include a drive module controller, which may receive and preprocess data from the sensor system(s) 306 and to control operation of the various vehicle systems. In some examples, the drive module controller may include one or more processors and memory communicatively coupled with the one or more processors. The memory may store one or more modules to perform various functionalities of the drive module(s) 314. Furthermore, the drive module(s) 314 also include one or more communication connection(s) that enable communication by the respective drive module with one or more other local or remote computing device(s).

In at least one example, the direct connection 312 may provide a physical interface to couple the one or more drive module(s) 314 with the body of the vehicle 302. For example, the direct connection 312 may allow the transfer of energy, fluids, air, data, etc. between the drive module(s) 314 and the vehicle 302. In some examples, the direct connection 312 may further releasably secure the drive module(s) 314 to the body of the vehicle 302.

In at least one example, the localization component 320, perception component 322, the planning component 324, and/or the occupant protection system 120 may process sensor data, as described above, and may send their respective outputs, over the one or more network(s) 332, to one or more computing device(s) 330. In at least one example, the localization component 320, the perception component 322, the planning component 324, and/or the occupant protection system 120 may send their respective outputs to the one or more computing device(s) 330 at a particular frequency, after a lapse of a predetermined period of time, in near real-time, etc.

The processor(s) 316 of the vehicle 302 and/or the processor(s) 336 of the computing device(s) 330 may include any suitable processor capable of executing instructions to process data and perform operations as described herein. By way of example and not limitation, the processor(s) 316 and 336 may include one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 318 and 334 are examples of non-transitory computer-readable media. The memory 318 and 334 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

Figure 12:
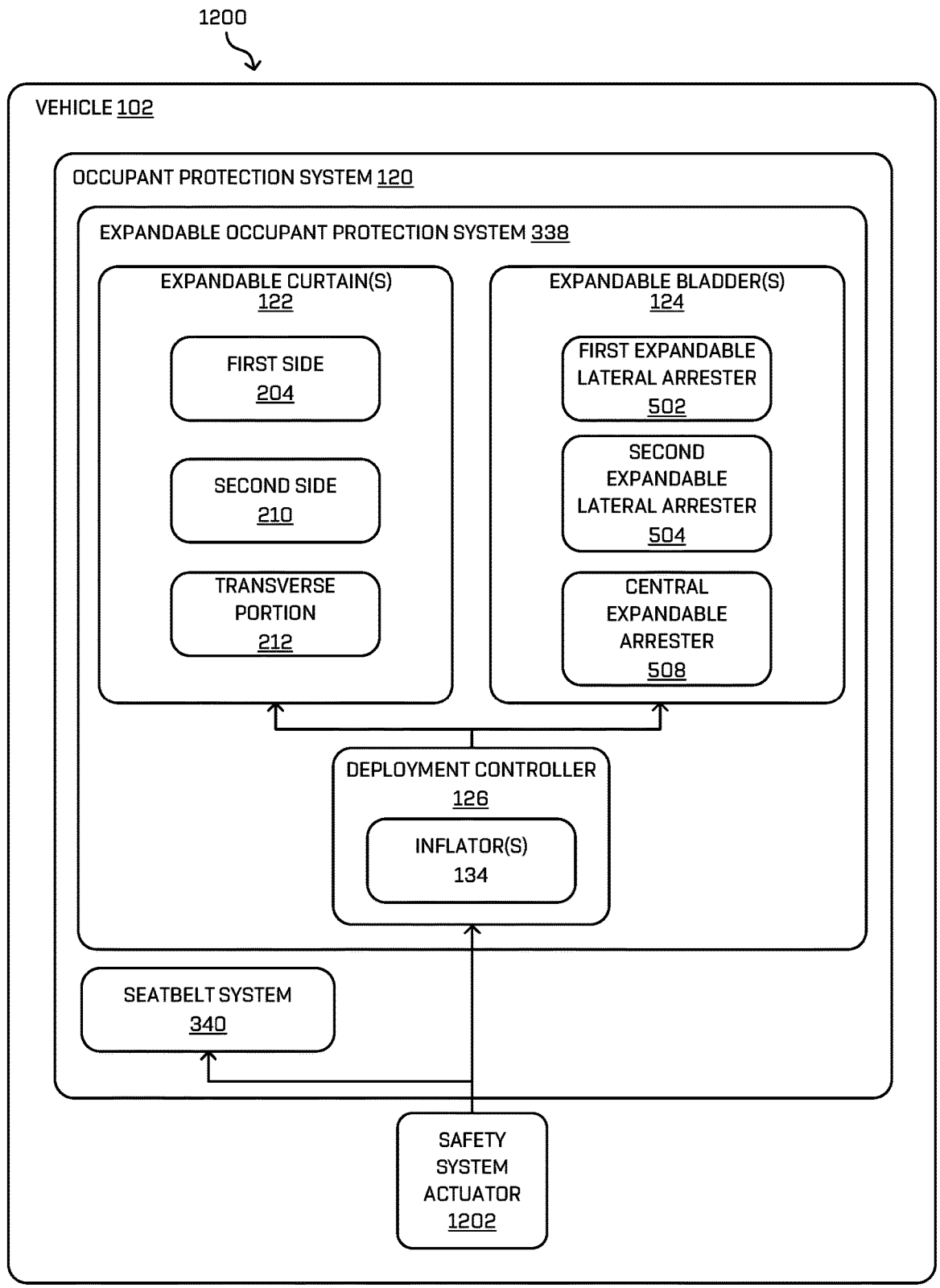
FIG. 12 is a block diagram including an example architecture for an occupant protection system

In some examples, for example as shown in FIG. 3, the occupant protection system 120 may include an expandable occupant protection system 338 and/or a seatbelt system 340, for example, as described herein with respect to FIG. 12. As shown in FIG. 3, the expandable occupant protection system 338 and the seatbelt system 340 may be associated with one or more of the vehicle computing device 304 on board the vehicle 302 or the remote computing device(s) 330.

It should be noted that while FIG. 3 is illustrated as a distributed system, in alternative examples, components of the vehicle 302 may be associated with the computing device(s) 330, and/or components of the computing device(s) 330 may be associated with the vehicle 302. That is, the vehicle 302 may perform one or more of the functions associated with the computing device(s) 330, and vice versa.

Figure 4:
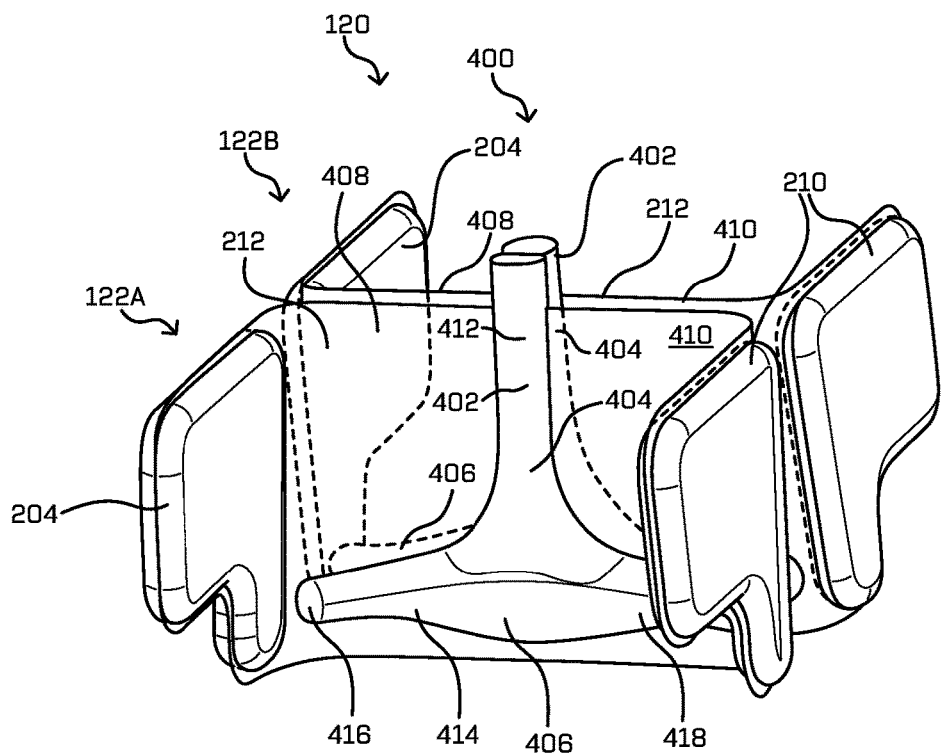
FIG. 4 is a perspective view of an example pair of expandable curtains shown in a deployed state.
Figure 5:
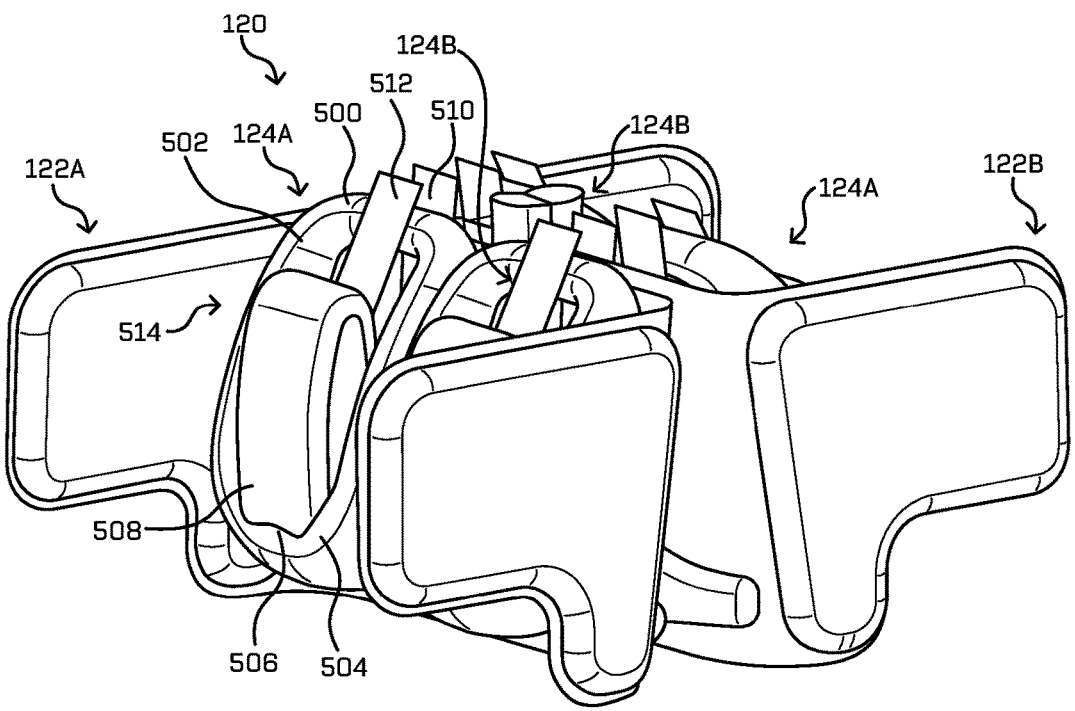
FIG. 5 is a perspective view of the example expandable curtains shown in FIG. 4 and example expandable bladders in a deployed state, with the expandable bladders in an example arrangement relative the expandable curtains.

As shown in FIGS. 4 and 5, some examples of the occupant protection system 120 may include first and second expandable curtains 122A and 122B configured to be expanded from a stowed state to a deployed state extending between the vehicle roof 130 and the vehicle floor 202 (see FIG. 2). In some such examples, the occupant protection system 120 may include first and second expandable bladders 124A and 124B configured to expand from the stowed state to the deployed state. The second expandable curtain 122B may be configured to deploy between the first expandable curtain 122A and the second seat 106B (see FIG. 2). In some examples, first and second expandable bladders 124A and 124B may be configured to deploy between the second expandable curtain 122B and the second seat 106B (see FIG. 1). In such example systems 120, protection may be provided for occupants of seats facing both directions. For example, the seats 106A and 106B may face one another, for example, as shown in FIG. 1, and the first and second expandable curtains 122A and 122B may be configured to deploy between the two seats 106A and 106B. In some examples, the deployment controller 126 may be configured to receive one or more signals indicative of a direction of travel of the vehicle 102, and cause deployment of the first expandable curtain 122A and/or the second expandable curtain 122B. For example, the first expandable curtain 122A, the first expandable bladder 124A, the second expandable curtain 122B, and/or the second expandable bladder 124B may be deployed based at least in part on the one or more signals indicative of the direction of travel of the vehicle 102.

For example, if the vehicle 102 is traveling with the first seat 106A facing the direction of travel (e.g., the first direction 114 shown in FIG. 1), before or during a collision, the deployment controller 126 may deploy the first expandable curtain 122A and/or one or more of a first expandable bladder 124A or a second expandable bladder 124B (e.g., associated with (e.g., within an effective distance from) the first seat 106A), and if the vehicle 102 is traveling with the second seat 106B facing the direction of travel (e.g., the second direction 116 shown in FIG. 1), before or during a collision, the deployment controller 126 may deploy the second expandable curtain 122B and/or one or more of a first expandable bladder 124A or second expandable bladder 124B (e.g., associated with (e.g., within an effective distance from) the second seat 106B).

FIGS. 4 and 5 show an example pair 400 of first and second expandable curtains 122A and 122B oriented relative to one another in example orientations consistent with the example vehicle shown FIG. 1, for example, a vehicle 102 having opposite facing seats 106A and 106B. As shown, the example expandable curtains 122A and 122B include a first side 204 configured to extend in a longitudinal direction along a portion of a first interior side 206 of the vehicle 102, and a second side 210 configured to extend in a longitudinal direction along a portion of a second interior side of the vehicle 102. The example expandable curtains 122A and 122B also include a transverse portion 212 extending in a transverse direction between the first side 204 and the second side 210 of the expandable curtains 122A and 122B. The expandable curtains 122A and/or 122B may be configured to deploy at any longitudinal location of the length of the vehicle 102, for example, to divide the interior 100. In the examples shown, the transverse portions 212 of the expandable curtains 122A and 122B, each include an expandable support chamber 402 extending in a direction along the length of the expandable curtains 122A and 122B. The example expandable support chamber 402 includes a vertical portion 404 configured to extend in the direction of the length of the expandable curtains 122A and 122B at least a portion of the distance between the vehicle roof 130 and the vehicle floor 202 when expanded. In some examples, the vertical portion 404 may extend diagonally at least a portion of the distance between the vehicle roof 130 and the vehicle floor 202 when expanded (e.g., while still extending vertically, the vertical portion 404 may also extend laterally across at least a portion of the respective transverse portion 212 of the respective expandable curtain 122). The example expandable support chamber 402 also includes a horizontal portion 406 extending at least partially from the first side 204 to the second side 210 of the expandable curtain 122, for example, in a direction normal or orthogonal to the length of the expandable curtains 122A and 122B.

In the example shown, the transverse portions 212 also each include a first lateral portion 408 extending between the first side 204 of the expandable curtains 122A and 122B, the vertical portion 404, and the horizontal portion 406, and a second lateral portion 410 extending between the second side 210 of the expandable curtains 122A and 122B, the vertical portion 404, and the horizontal portion 406. In the examples shown, the first and second lateral portions 408 and 410 are not expandable, but rather, form a web between the first side 204 and second side 210, the vertical portion 404, and the horizontal portion 406. In some examples, one or more of the first and second lateral portions 408 and 410 may be expandable. Although the first and second expandable curtains 122A and 122B are depicted as being the same, they may differ from one another. In some examples, the first and second expandable curtains 122A and 122B may be formed as a single expandable curtain, for example, with a common transverse portion 212, rather than being separately deployable expandable curtains 122A and 122B.

In the example shown in FIG. 4, the vertical portion 404 defines a raised portion 412 between the first lateral portion 408 and the second lateral portion 410 of the transverse portion 212 of the expandable curtains 122A and 122B. For example, the vertical portion 404 may include a tubular portion having a cross-sectional area in a plane transverse to a direction along the length of the expandable curtains 122A and 122B that increases as the vertical portion 404 approaches the horizontal portion 406. Some examples of the expandable curtains 122A and/or 122B may include multiple vertical portions.

In some examples, the horizontal portion 406 may include a lower tubular portion 414 having a cross-sectional area in a plane substantially parallel to the first and second sides 204 and 210 of the expandable curtains 122A and 122B that increases as the horizontal portion 406 approaches the vertical portion 404, for example, as shown in FIG. 4. In some examples, the transverse portion 212 of the expandable curtains 122A and 122B defines a support face side 220 defining a reaction surface, and the lower tubular portion 414 of the horizontal portion 406 extends from a first end 416 to a second end 418, wherein the first end 416 and second end 418 curve away from the support face side 220 of the transverse portion 212 of the expandable curtains 122A and 122B (e.g., as viewed from above).

As shown in FIG. 4, each of the expandable curtains 122A and 122B is configured such that the first side 204 of the expandable curtains 122A and 122B, the first lateral portion 408 of the transverse portion 212, the expandable support chamber 402, the second lateral portion 410 of the transverse portion 212, and the second side 210 of the expandable curtains 122A and 122B may form a contiguous barrier extending from the first side 204 to the second side 210 of the expandable curtains 122A and 122B. In some examples, the first side 204, the second side 210, and the transverse portion 212 may be separate components, but contiguous. In some examples, the first side 204, the second side 210, and the transverse portion 212 may form a continuous barrier extending from the first side 204 to the second side 210 of one or more of the expandable curtains 122A and 122B.

FIG. 5 shows pairs of the example the expandable bladders 124A and 124B in relation to two example expandable curtains 122A and 122B, all in a deployed state. In the example shown in FIG. 5, the occupant protection system 120 includes two first expandable bladders 124A configured to expand from a stowed state to a deployed state associated with (e.g., directly or indirectly coupled to) an expandable curtain, such that the first expandable bladders 124A in the deployed state nest between the first side 204 and the expandable support chamber 402 of each of the expandable curtains 122A and 122B. As shown, some examples may also include two second expandable bladders 124B configured to expand from a stowed state to a deployed state associated with the expandable curtains 122A and 122B, such that the second expandable bladders 124B in the deployed state nest between the second side 210 and the expandable support chamber 402 of each of the expandable curtains 122A and 122B. Different numbers of expandable bladders 124 are contemplated. It is contemplated that the expandable curtains 122A and 122B could be in fluid communication with one another and act as a single expandable volume deployable together and/or that the pair of expandable curtains 122A and 122B could be replaced by a single expandable curtain configured to provide reaction surfaces on opposing sides of the transverse portion for expandable bladders on opposing sides of the expandable curtain.

In the example shown in FIG. 5, each of the expandable bladders 124 is configured to expand from a stowed state to a deployed state, and includes a coupling portion 500 configured to be coupled to a portion of the vehicle 102 associated with (e.g., directly or indirectly coupled to) a vehicle roof 130. For example, the coupling portion 500 may be coupled directly or indirectly to the vehicle roof 130, for example, such that the coupling portion 500 is suspended from the vehicle roof 130 and supports the expandable bladders 124. Each of the example expandable bladders 124 shown in FIG. 5 also includes a first expandable lateral arrester 502 associated with (e.g., directly or indirectly coupled to and/or in flow communication with) the coupling portion 500, and a second expandable lateral arrester 504 associated with (e.g., directly or indirectly coupled to and/or in flow communication with) the coupling portion 500. The example expandable bladders 124 also include a lower support 506 associated with (e.g., directly or indirectly coupled to and/or in flow communication with) the first and second expandable lateral arresters 502 and 504, and a central expandable arrester 508 associated with (e.g., directly or indirectly coupled to and/or in flow communication with) the lower support 506 and configured to pivot relative to the lower support 506 upon contact with a portion of an occupant 104 of the vehicle 102, as explained herein. For example, a lower portion of the central expandable arrester 508 may be coupled to the lower support 506, for example, with substantially the remainder of the central expandable arrester 508 being substantially free to pivot about the lower portion.

The example expandable bladders 124 shown in FIG. 5 also each include an optional first strap 510 coupled to the lower support 506 and configured to be coupled to a portion of the vehicle 102 associated with (e.g., directly or indirectly coupled to) the vehicle roof 130 (e.g., a structural member of the vehicle chassis and/or an interior panel), and a second strap 512 coupled to the central expandable arrester 508 and configured to be coupled to a portion of the vehicle 102 associated with (e.g., directly or indirectly coupled to) the vehicle roof 130. In some examples, the first strap 510 may be configured to assist with stabilizing and/or supporting its respective expandable bladder 124. In some examples, the second strap 512 may be configured to assist with positioning and supporting the central expandable arrester 508 before and during contact with the occupant 104.

In the examples shown in FIG. 5, one or more of the coupling portion 500, the first expandable lateral arrester 502, the second expandable lateral arrester 504, or the lower support 506 form an expandable arrester chamber 514. For example, the coupling portion 500, the first expandable lateral arrester 502, the second expandable lateral arrester 504, and the lower support 506 may form a continuous expandable arrester chamber 514. In some examples, the continuous expandable arrester chamber 514 is substantially ring-shaped and defines a central space 516, and the continuous expandable arrester chamber 514 and the central expandable arrester 508 are configured, such that the central expandable arrester 508 pivots into the central space 516 upon contact by the occupant 104 of the vehicle 102, for example, as explained herein. For example, the central expandable arrester 508 and the first and second expandable lateral arresters 502 and 504 are configured such that the central expandable arrester 508 pivots to position at least partially between the first and second expandable lateral arresters 502 and 504 upon contact with the portion of the occupant 104 of the vehicle 102. In some examples, the central expandable arrester 508 and the first and second expandable lateral arresters 502 and 504 are configured such that shoulders of the occupant 104 of the vehicle 102 contact the first and second expandable lateral arresters 502 and 504, and the head of the occupant 104 contacts the central expandable arrester 508.

In some examples, the first strap 510 and the second strap 512 may be formed from a partially elastic material. In some examples, the first and second straps 510 and 512 may be formed from the same material, and in some examples, the first and second straps 510 and 512 may be formed from a different material, for example, such that the second strap 512 is relatively more elastic than the first strap 510.

Figure 6A:
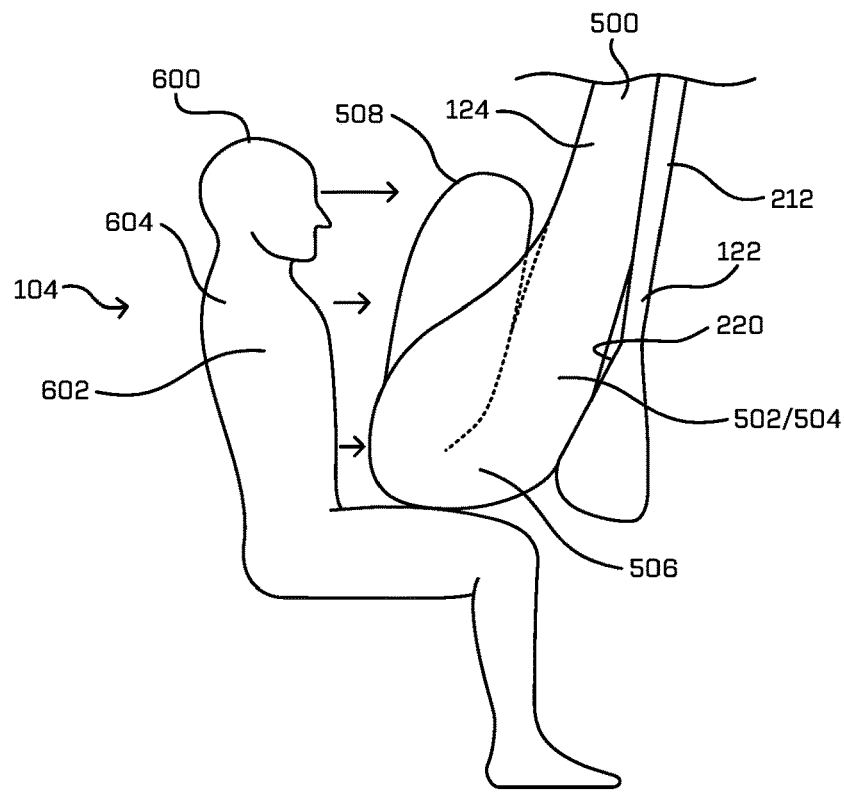
FIG. 6A is a schematic diagram showing an example vehicle occupant before contacting an example expandable bladder supported by an example expandable curtain.
Figure 6B:
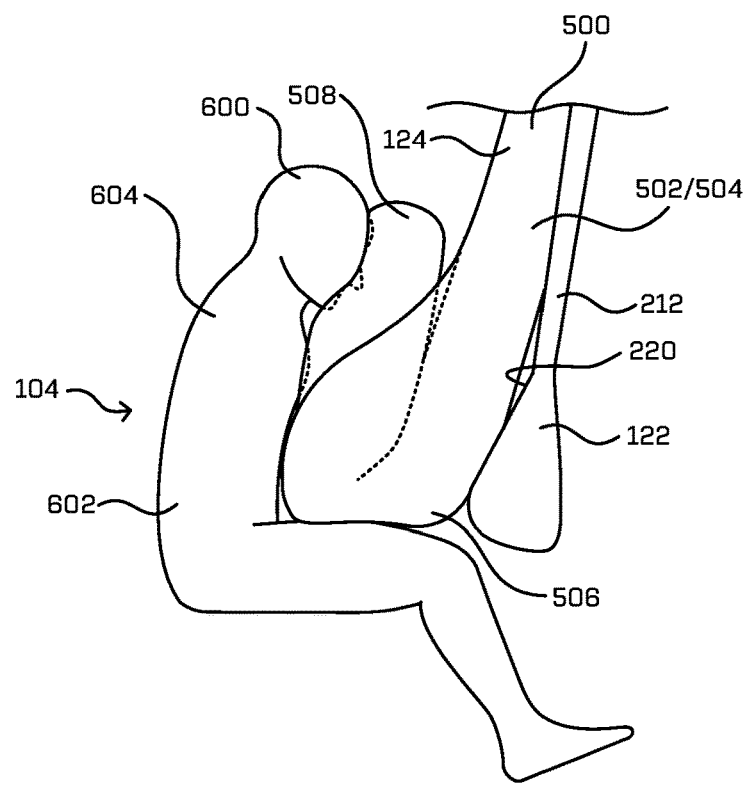
FIG. 6B is a schematic diagram showing the example occupant from FIG. 6A contacting the example expandable bladder.

FIGS. 6A and 6B are schematic sequence views of an example occupant 104 during a collision involving a vehicle 102 including an example occupant protection system 120. In the examples shown, the occupant protection system 120 includes an expandable curtain 122 including at least a transverse portion 212 suspended from the vehicle roof 130, and an expandable bladder 124 suspended from the vehicle roof 130 and including a coupling portion 500, first and second expandable lateral arresters 502 and 504, a lower support 506, and a central expandable arrester 508. FIG. 6A shows the example expandable curtain 122 and the example expandable bladder 124 in the deployed state with the occupant 104 still seated in the seat 106. As explained herein, in some examples the deployment controller 126 may receive one or more signals from the vehicle 102 indicative of a collision or a predicted collision involving the vehicle 102, and the deployment controller 126 may activate one or more inflators 134 to deploy the expandable curtain 122 and/or the expandable bladder 124. In some examples, only expandable bladders 124 associated with seats 106 in which occupants 104 have been detected will be deployed. For example, only expandable bladders 124 in front of and close enough to the occupied seats that would be effective in arresting movement of the respective occupants during a collision will be deployed.

FIG. 6B shows the example occupant 104 being thrown forward in the vehicle 102 during a collision. In the example shown, the occupant's head 600 and torso 602 are thrown forward into the expandable bladder 124, and the expandable bladder 124, supported by the expandable curtain 122, arrests the forward movement of the occupant 104 in a cushioned manner to reduce the likelihood of injury. In some examples, the occupant's head 600 contacts the central expandable arrester 508, which pivots relative to the lower support 506 as described herein, and the occupant's shoulders 604 contact the first and second expandable lateral arresters 502 and 504, which arrest the forward movement of the occupant's shoulders 604 in a cushioned manner.

Figure 7:
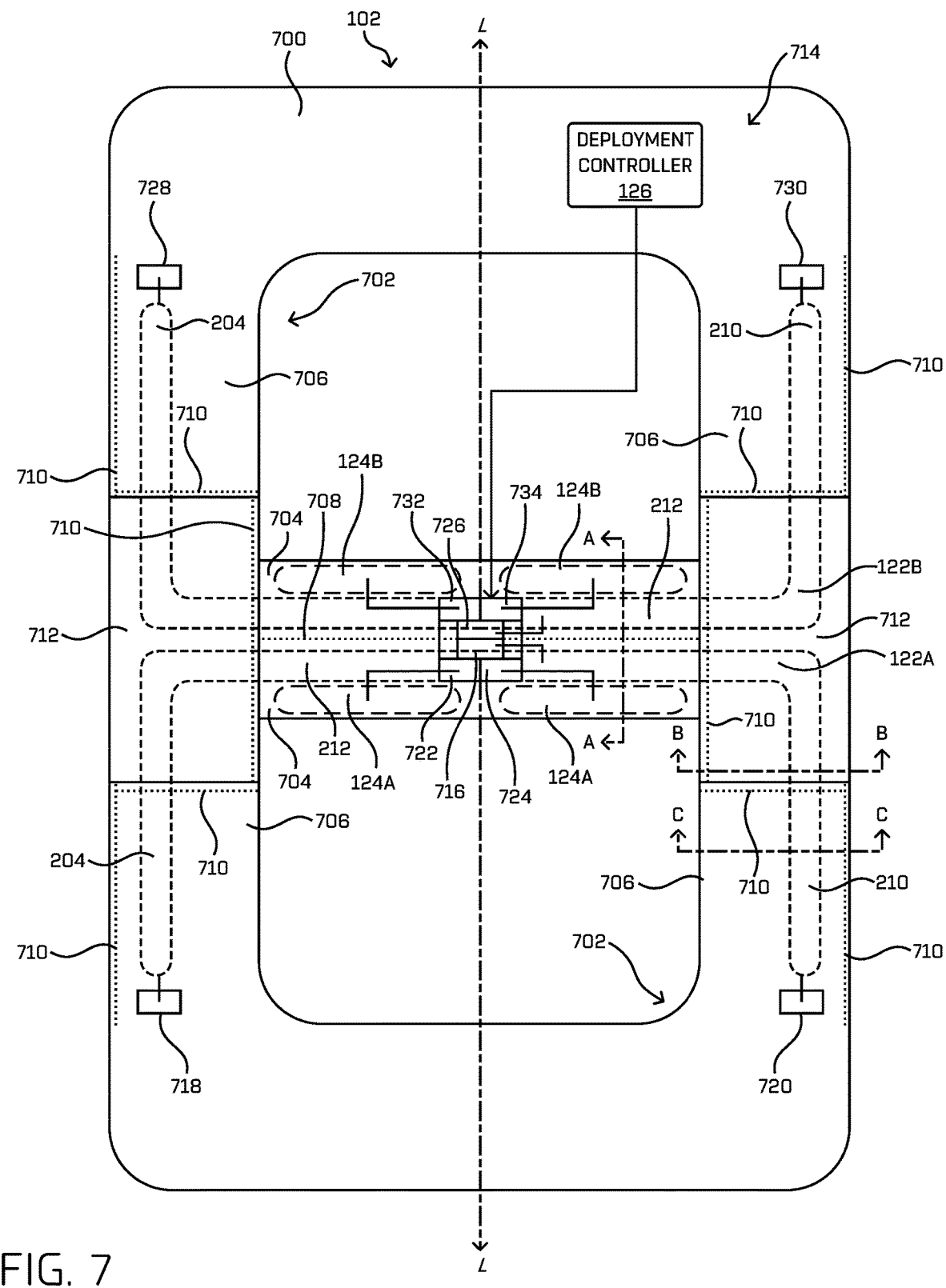
FIG. 7 is a schematic partial view of an example vehicle ceiling from below showing an example layout of ceiling trim panels and inflators for an occupant protection system.

FIG. 7 is a schematic partial view of an example vehicle ceiling 700 from below showing an example layout of example ceiling trim panels and example inflators for an occupant protection system 120 in relation to example expandable curtains 122A and 122B and example expandable bladders 124A and 124B. In some examples, the inflators shown in FIG. 7 may correspond to the inflators 134 shown in FIG. 1.

As shown in FIG. 7, the occupant protection system 120 includes a ceiling trim panel system 702. The example ceiling trim panel system 702 may include a transverse ceiling trim panel 704 configured to be coupled to the ceiling 700 of the vehicle 102 and extend in a first direction substantially transverse relative to a longitudinal axis L of the vehicle 102 (e.g., extending in a direction between the ends 112 and 118 of the vehicle 102). In some examples, the transverse ceiling trim panel 704 may be configured to cover the transverse portion 212 of the expandable curtains 122A and 122B and/or one or more of the expandable bladders 124A or 124B, in a stowed state and deflect to allow deployment of one or more of the transverse portions 212 of the expandable curtain 122A or 122B to a deployed state (see, e.g., FIGS. 2 and 4-6B), and/or one or more of the expandable bladders 124A or 124B. Some examples of the ceiling trim panel system 702 may also include one or more side ceiling trim panels 706 configured to be coupled to the ceiling 700 and extend in a second direction substantially parallel to the longitudinal axis L of the vehicle 102 (e.g., substantially perpendicular to the first direction in which the transverse ceiling trim panel 704 extends). In some examples, the one or more side ceiling trim panels 706 may be configured to cover respective sides 204 and/or 210 of the expandable curtains 122A and/or 122B in the stowed state and deflect to allow deployment of the sides 204 and/or 210 of the expandable curtain 122A and/or 122B to a deployed state (see, e.g., FIGS. 4-6B).

For example, as schematically shown in FIG. 7, the one or more transverse ceiling trim panels 702 may define one or more transverse seams 708 extending substantially parallel to the first direction (e.g., substantially transverse to (e.g., substantially perpendicular to) the longitudinal axis L). In some examples, the transverse seam(s) 708 may be configured to create an opening through which one or more of the transverse portions 212 of the one or more expandable curtains 122A and/or 122B, and/or one or more of the expandable bladders 124A or 124B, pass(es) when deploying from the stowed state to the deployed state. The transverse seams 708 may be defined by one or more respective edges of the one or more transverse ceiling trim panels 704, for example, where the respective edge meets a portion of vehicle 102, and/or the transverse seams 708 may be defined by an area of weakness created in the one or more transverse ceiling trim panels 704, for example, a line of reduced material thickness, a line scored on the surface of the transverse ceiling trim panels 704, and/or a line of perforations in the transverse ceiling trim panels 704. In some examples, the transverse ceiling trim panels 704 may include a living hinge, for example, spaced from the transverse seam 708 to facilitate deflection of the transverse ceiling trim panels 704.

As schematically shown in FIG. 7, the one or more side ceiling trim panels 706 may define one or more longitudinal seams 710 extending substantially parallel to the second direction (e.g., substantially parallel to the longitudinal axis L). The one or more longitudinal seams 710 may be configured to create an opening through which one or more respective sides 204 and/or 210 of the expandable curtain 122A and/or 122B pass(es) when deploying from the stowed state to the deployed state. The longitudinal seams 710 may be defined by one or more respective edges of the one or more side ceiling trim panels 706, for example, where the respective edge meets a portion of vehicle 102, and/or the longitudinal seams 710 may be defined by an area of weakness created in the one or more side ceiling trim panels 706, for example, a line of reduced material thickness, a line scored on the surface of the side ceiling trim panels 706, and/or a line of perforations in the side ceiling trim panels 706. In some examples, the side ceiling trim panels 706 may include a living hinge, for example, spaced from the longitudinal seam 710 to facilitate deflection of the side ceiling trim panels 704.

As shown in FIG. 7, some examples of the ceiling trim panel system 702 may include a joining ceiling trim panel 712 associated with the one or more transverse ceiling trim panels 704 and the one or more side ceiling trim panels 706. For example, as shown in FIG. 7, the joining ceiling trim panel 712 may be configured to be coupled to the ceiling 700 of the vehicle 102 and cover a portion of the one or more transverse portions 212 of the one or more expandable curtains 122A and/or 122B and/or a portion of the one or more sides 204 and/or 210 of the expandable curtains 122A and/or 122B in the stowed state and deflect to allow deployment of the one or more transverse portions 212 and/or the one or more sides 204 and/or 210 of the expandable curtain 122A and/or 122B to a deployed state. For example, one or more of the transverse ceiling trim panels 704 and/or one or more of the side ceiling trim panels 706 may be configured to create a contiguous opening through which the one or more transverse portions 212 and/or one or more of the sides 204 and/or 210 pass when deploying from the stowed state to the deployed state. In some examples, the one or more joining ceiling trim panels 712 may partially form one or more contiguous openings, along with the one or more transverse ceiling trim panels 704 and/or the one or more side ceiling trim panels 706. In some examples, the joining ceiling trim panels 712 may include a living hinge, for example, to facilitate deflection of the joining ceiling trim panels 712. In some examples, a tether or cord may be coupled to one or more of the joining ceiling trim panels 712 and the ceiling of the vehicle 102, for example, to prevent one or more of the joining ceiling trim panels 712 from separating completely from the ceiling upon deployment of the expandable curtains 122A and/or 122B and/or deployment of the expandable bladders 124A and/or 124B.

FIG. 7 also schematically shows an example deployment system 714 for activating deployment of one or more of the expandable curtains 122A or 122B and/or one or more of the expandable bladders 124A or 124B. For example, the deployment system 714 may include the deployment controller 126, which may be configured to activate one or more inflators in flow communication with one or more of the expandable curtains 122A or 122B, and/or one or more of the expandable bladders 124A or 124B. For example, as shown in FIG. 7, the example deployment system 714 includes five inflators 716, 718, 720, 722, and 724 associated with the expandable curtain 122A and the expandable bladders 124A and 124B associated with the expandable curtain 122A. In some examples, one or more of the inflators 716, 718, 720, 722, or 724 may include more than a single inflator; one or more of the inflators 716, 718, 720, 722, or 724 may be combined; one or more of the inflators 716, 718, 720, 722, or 724 may have a different capacity (e.g., a different volume output, pressurization, and/or different flow rate output), or one or more of the inflators 716, 718, 720, 722, or 724 may be of a different type (e.g., a pyrotechnic-type inflator, a gas-type inflator, or a hybrid pyrotechnic and gas-type inflator). Similarly, the example deployment system 714 includes five inflators 726, 728, 730, 732, and 734 associated with the expandable curtain 122B and the expandable bladders 124A and 124B associated with the expandable curtain 122B. In some examples, one or more of the inflators 726, 728, 730, 732, or 734 may include more than a single inflator; one or more of the inflators 726, 728, 730, 732, or 734 may be combined; one or more of the inflators 726, 728, 730, 732, or 734 may have a different capacity (e.g., a different volume output, pressurization, and/or different flow rate output), or one or more of the inflators 726, 728, 730, 732, or 734 may be of a different type (e.g., a pyrotechnic-type inflator, a gas-type inflator, or a hybrid pyrotechnic and gas-type inflator). The locations of the inflators are merely examples of possible locations. For example, one or more of the inflators 718, 720, 728, or 730 may be located at any location adjacent to any portion of the respective sides 204 and/or 210 of the expandable curtains 122A and/or 122B.

In the example shown, the inflator 716 is in flow communication with the expandable curtain 122A and configured to cause, upon activation of the inflator 716 by the deployment controller 126, the expandable curtain 122A to deploy from a stowed state to a deployed state. For example, the inflator 716 is in flow communication with the transverse portion 212 of the expandable curtain 122A. The inflators 718 and 720 in the example shown are in flow communication with the sides 204 and 210, respectively, of the expandable curtain 122A. Each of the inflators 722 and 724 is in flow communication with one of the expandable bladders 124A and 124B associated with the expandable curtain 122A.

Similarly, the inflator 726 is in flow communication with the expandable curtain 122B and configured to cause, upon activation of the inflator 726 by the deployment controller 126, the expandable curtain 122B to deploy from a stowed state to a deployed state. For example, the inflator 726 is in flow communication with the transverse portion 212 of the expandable curtain 122B. The inflators 728 and 730 in the example shown are in flow communication with the sides 204 and 210, respectively, of the expandable curtain 122B. Each of the inflators 732 and 734 is in flow communication with one of the expandable bladders 124A and 124B associated with the expandable curtain 122B.

In some examples, the deployment controller 126 may be configured to activate the one or more of the inflators sequentially relative to one or more of the other inflators. For example, the deployment controller 126 may be configured to activate one or more of the inflator 716 or the inflator 726 sequentially prior in time to activating one or more of the inflator 722, the inflator 724, the inflator 732, or the inflator 734. For example, the deployment controller 126 may be configured to activate the inflator 716 in flow communication with the transverse portion 212 of the expandable curtain 122A prior in time (e.g., about 500 milliseconds or less, about 250 milliseconds or less, about 100 milliseconds or less, about 50 milliseconds, about 25 milliseconds or less, or about 5 milliseconds or less) relative to activating one or more of the inflators 722 or 724 in flow communication, respectively, with the expandable bladders 124A and 124B associated with the expandable curtain 122A. Such staged deployment may reduce the total amount of energy to be expended (e.g., by requiring a small, high pressure, and/or low volume inflator to break the trim, and then expanding one or more of a curtain or expandable bladder with one or more separate inflators). Similarly, the deployment controller 126 may be configured to activate the inflator 726 in flow communication with the transverse portion 212 of the expandable curtain 122B prior in time (e.g., about 500 milliseconds or less, about 250 milliseconds or less, about 100 milliseconds or less, about 50 milliseconds or less, about 25 milliseconds or less, or about 5 milliseconds or less) relative to activating one or more of the inflators 732 or 734 in flow communication, respectively, with the expandable bladders 124A and 124B associated with the expandable curtain 122B. In some examples, both the inflators 716 and 726 may be concurrently (e.g., substantially simultaneously) activated prior in time to activating one or more of the inflators 722, 724, 732, or 734 in flow communication with the expandable bladders 124A and 124B associated with both expandable curtains 122A and 122B. In some such examples, one or more of the inflators 722, 724, 732, or 734 may be concurrently (e.g., substantially simultaneously) activated.

Figure 8A:
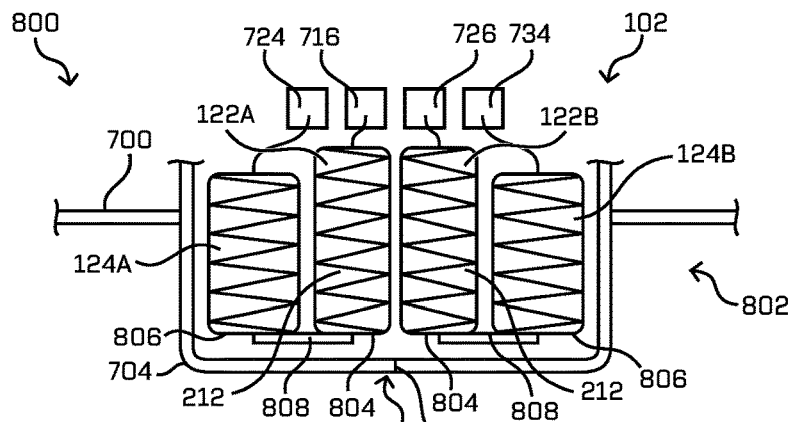
FIG. 8A is a schematic partial side section view taken along line A-A of FIG. 7 of example expandable curtains and expandable bladders in an example stowed state.
Figure 8B:
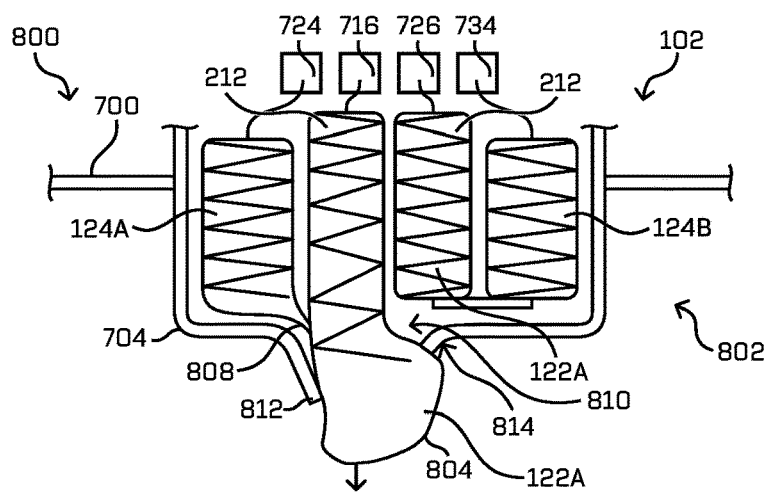
FIG. 8B is a schematic partial side section view of the examples shown in FIG. 8A showing a first instance in an example deployment sequence with one of the expandable curtains and one of the expandable bladders beginning to deploy upon activation of an inflator as an example transverse ceiling trim panel deflects.
Figure 8C:
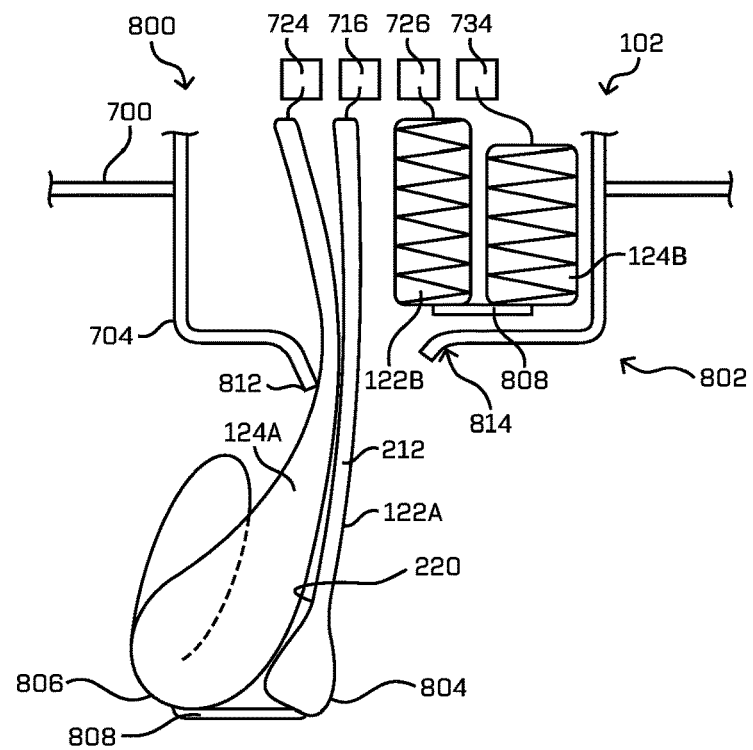
FIG. 8C is a schematic partial side section view of the examples shown in FIG. 8A showing a second instance in the example deployment sequence with both the expandable curtain and the expandable bladder completely deployed.

FIGS. 8A-8C schematically depict an example deployment sequence 800, with one of the expandable curtains 122A and one of the expandable bladders 124A deploying from a stowed state to a deployed state. FIG. 8A shows a schematic partial side section view taken along line A-A of FIG. 7, showing the transverse portions 212 of the expandable curtains 122A and 122B and expandable bladders 124A and 124B, all of which are shown in an example stowed state. Although only a single expandable bladder 124A and a single expandable bladder 124B are shown in FIG. 8A due to the limitations of the side view, each of the expandable bladder 124A and the expandable bladder 124B may represent more than one expandable bladder, for example, with the additional expandable bladders hidden from the view shown in FIG. 8A.

As shown in FIG. 8A, the expandable curtains 122A and 122B and the expandable bladders 124A and 124B may be received in the stowed state in a housing 802, which may, in some examples, generally correspond to the housing 132 shown in FIG. 1. As shown, the transverse ceiling trim panel 704 may at least partially define the housing 802, which is coupled to the ceiling 700 (see FIG. 7) and/or the vehicle roof 130 (see FIG. 1) of the vehicle 102. In the example shown, the transverse ceiling trim panel 704 defines the transverse seam 708 (see FIG. 7), which may extend at least partially the length of the transverse ceiling trim panel 704 (i.e., into the page as shown in FIG. 8A), as described herein. In some examples, the expandable curtains 122A and 122B and the expandable bladders 124A and 124B may be stowed in a fan-folded- or accordion-like fashion to improve deployment (e.g., to increase the rate of deployment and/or to improve the completion of deployment). Other stowage arrangements are contemplated.

As shown in FIG. 8A, in some examples, the expandable curtains 122A and 122B include a distal curtain end 804, and the expandable bladders 124A and 124B include a distal bladder end 806. As shown in FIGS. 8A-8C, some examples may include a tether 808 coupling each of the distal curtain ends 804 to an associated one of the distal bladder ends 806, for example, as shown.

Also shown in FIGS. 8A-8C are the example inflators 716, 724, 726, and 734, which are respectively in flow communication with the expandable curtain 122A, the expandable bladder 124A, the expandable curtain 122B, and the expandable bladder 124B. As explained herein, the deployment controller 126 (FIG. 7) may be in communication with the inflators and may be configured to activate the inflator 716 in flow communication with the transverse portion 212 of the expandable curtain 122A prior in time relative to activating the inflator 724 in flow communication with the expandable bladder 124A, which is associated with the expandable curtain 122A.

For example, FIG. 8B is a schematic partial side section view a first instance in the example deployment sequence 800, with the expandable curtain 122A and the expandable bladder 124A beginning to deploy upon activation of the inflator 716 in flow communication with the expandable curtain 122A. Thereafter, the deployment controller may activate the inflator 724, which is in flow communication with the expandable bladder 124A. As shown in FIG. 8B, activation of the inflator 716 creates a force sufficient to create a transverse opening 810 through which the transverse portion 212 of the expandable curtain 122A passes when expanding from the stowed state to the deployed state. The tether 808 coupled to the distal bladder end 806 of the expandable bladder 124A begins to pull the expandable bladder 124A toward its deployed state, assisting with deployment of the expandable bladder 124A, before and/or during activation of the inflator 724 in flow communication with the expandable bladder 124A. As shown, the transverse ceiling trim panel 704 defines a transverse distal edge 812 configured to deflect through an arc from a central portion 814 of the transverse ceiling trim panel 704 to a direction transverse to the ceiling 700 of the vehicle 102, for example, as shown in FIGS. 8B and 8C. In some examples, the inflator 716 associated with the expandable curtain 122A may have a higher capacity (e.g., a higher volume and/or flow rate) than the inflator 724 associated with the expandable bladder 124A, for example, to provide a force sufficient to cause the transverse ceiling trim panel 704 to open along the transverse seam 708. In some examples, as a result of the ability of the expandable curtain 122A to create the transverse opening 810, the inflator 724 associated with the expandable bladder 124A may have a reduced capacity relative to the inflator 716 because, in some examples, it may not contribute to, or may only partially contribute to, creating the transverse opening 810. In some examples, the inflator 724 associated with the expandable bladder 124A may have an increased capacity relative to the inflator 716. In some examples, the inflators may be selected or configured to activate with a force sufficient to deflect the trim panels, which may vary, for example, as a function of material properties of the trim panels and/or a cross-sectional engagement area against which the expandable curtain and/or expandable bladder acts.

FIG. 8C schematically shows a second instance in the example deployment sequence 800, with both the expandable curtain 122A and the expandable bladder 124A completely deployed. As shown, the tether 808 remains coupled to the distal curtain end 804 of the expandable curtain 122A and the distal bladder end 806 of the expandable bladder 124A. In some examples, this may function to improve the stabilization of the expandable bladder 124A against the reaction surface created by the support face side 220 of the expandable curtain 122A, for example, as a person impacts the expandable bladder 124A.

Figure 9A:
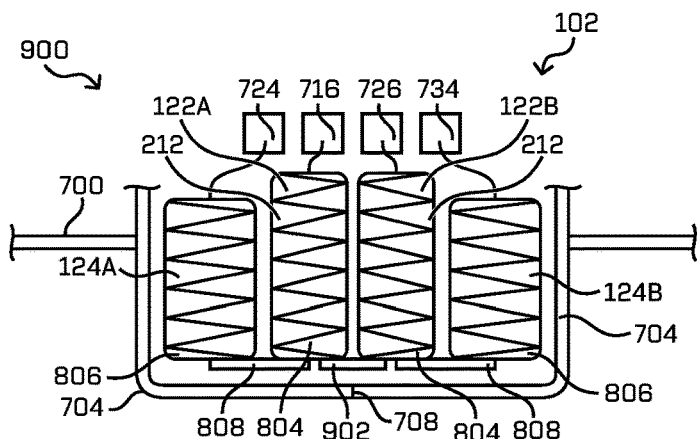
FIG. 9A is a schematic partial side section view taken along line A-A of FIG. 7 of example expandable curtains and expandable bladders in an example stowed state.
Figure 9B:
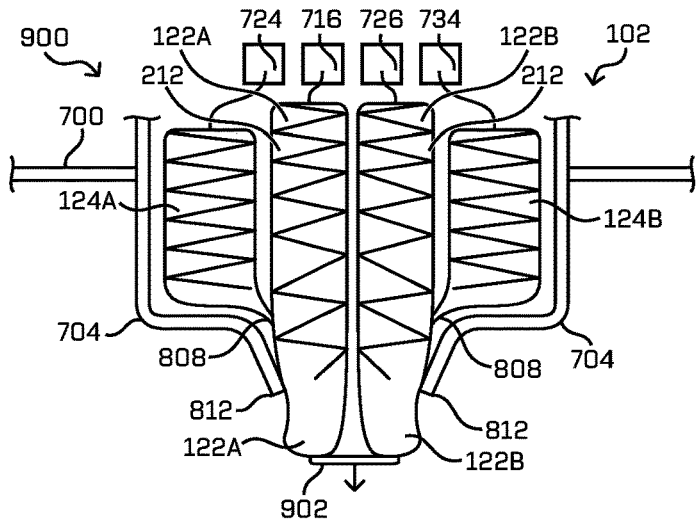
FIG. 9B is a schematic partial side section view of the examples shown in FIG. 9A showing a first instance in an example deployment sequence with both expandable curtains and both expandable bladders beginning to deploy upon activation of associated inflators as an example transverse ceiling trim panel deflects.
Figure 9C:
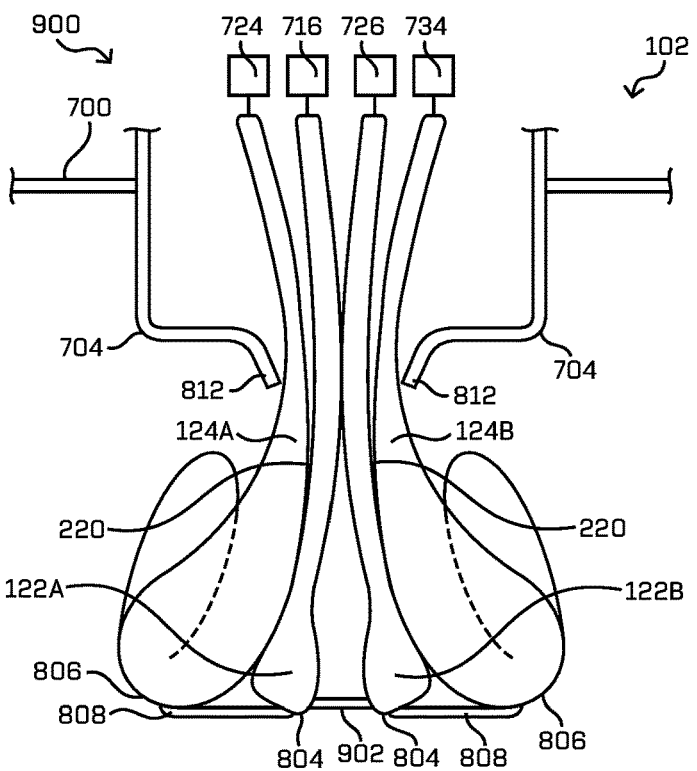
FIG. 9C is a schematic partial side section view of the examples shown in FIG. 9A showing a second instance in the example deployment sequence with both the expandable curtains and both the expandable bladders completely deployed.

In the example shown in FIGS. 8A-8C, the expandable curtain 122A and the expandable bladder 124A are deployed independently from the expandable curtain 122B and the expandable bladder 124B. FIGS. 9A-9C schematically depict an example deployment sequence 900 in which both the expandable curtain 122A and the expandable curtain 122B are deployed concurrently (e.g., substantially simultaneously), followed by the concurrent deployment of the expandable bladder 124A and the expandable bladder 124B.

In some examples, for example, as shown in FIGS. 9A-9C, the distal curtain ends 804 of the expandable curtain 122A and the expandable curtain 122B may be coupled to one another via one or more tethers 902. The one or more tethers 902 may function to assist with deployment of the expandable curtains 122A and 122B and, in some examples, stabilize the expandable curtains 122A and 122B once in the deployed state, for example, as shown in FIG. 9C. The example shown in FIGS. 9A-9C, also includes tethers 808 coupling the respective distal curtain ends 804 of expandable curtain 122A and the expandable curtain 122B and the respective distal bladder ends 806 of the expandable bladders 124A and 124B to one another. This may function to improve the stabilization of the expandable bladders 124A and 124B against the respective reaction surfaces created by the respective support face sides 220 of the expandable curtains 122A and 122B, and/or to act in a redundant manner for safety, for example, if one inflator fails or activates with a force insufficient to deflect the associated trim panel.

As shown in FIG. 9B, deployment may commence, for example, when the deployment controller 126 (not shown in FIGS. 9A-9C) activates the inflators 716 and 726 respectively associated with the expandable curtain 122A and the expandable curtain 122B. In some examples, this may occur concurrently (e.g., substantially simultaneously), as shown in FIG. 9B.

Thereafter, the deployment controller 126 may activate either one or more of the inflator 724 and the inflator 734, which are in flow communication with the expandable bladder 124A and the expandable bladder 124B, respectively. As shown in FIG. 9B, activation of the inflators 716 and 726 creates a force sufficient to create a transverse opening 810 through which the transverse portions 212 of the expandable curtains 122A and 122B pass when expanding from the stowed state to the deployed state. The tether 808 coupled to the distal bladder end 806 of the expandable bladder 124A, and the tether 808 coupled to the remote bladder end 806 of the expandable bladder 124B, begin to pull the expandable bladders 124A and 124B toward the respective deployed states, assisting with deployment of the expandable bladders 124A and 124B, before and/or during activation of the inflators 724 and 734 in flow communication respectively with the expandable bladders 124A and 124B. As shown, the transverse ceiling trim panel 704 defines a pair of transverse distal edges 812 configured to deflect through an arc from a central portion 814 of the transverse ceiling trim panel 704 to a direction transverse to the ceiling 700 of the vehicle 102, for example, as shown in FIGS. 9B and 9C. In some examples, the inflators 716 and 726 associated with the expandable curtains 122A and 122B may have a higher capacity (e.g., a higher volume, higher pressure, and/or higher flow rate) than the inflators 724 and/or 734 associated with the expandable bladders 124A and 124B, for example, to provide a force sufficient to cause the transverse ceiling trim panel 704 to open along the transverse seam 708. In some examples, as a result of the ability of the inflators 716 and 726 and the deployment of the expandable curtains 122A and 122B to create the transverse opening 810, the inflators 724 and 734 associated with the expandable bladders 124A and 124B may have reduced capacities relative to the inflators 716 and 726, since, in some examples, they may not contribute, or may only partially contribute, to creating the transverse opening 810.

FIG. 9C schematically shows a second instance in the example deployment sequence 900, with both expandable curtains 122A and 122B, and both expandable bladders 124A and 124B completely deployed. As shown, the tethers 808 remain coupled to the respective distal curtain ends 804 of the expandable curtains 122A and 122B and the respective distal bladder ends 806 of the expandable bladders 124A and 124B. In some examples, this may function to improve the stabilization of the expandable bladders 124A and 124B against the respective reaction surfaces created by the support face sides 220 of the expandable curtains 122A and 122B. Although FIGS. 8A-8C and 9A-9C show examples in which the expandable curtains 122A and 122B, and the expandable bladders 124A and 124B pass through a central opening 810 of the transverse ceiling trim panel 704, in some examples, the transverse ceiling trim panel 704 may be configured, such that upon deployment the expandable curtain 122A and/or the expandable bladder 124A pass through a first lateral opening, and the expandable curtain 122B and/or the expandable bladder 124B pass through a second lateral opening, for example, with the first lateral opening and the second lateral opening being on opposite sides of a central portion of the transverse ceiling trim panel 704.

Figure 10A:
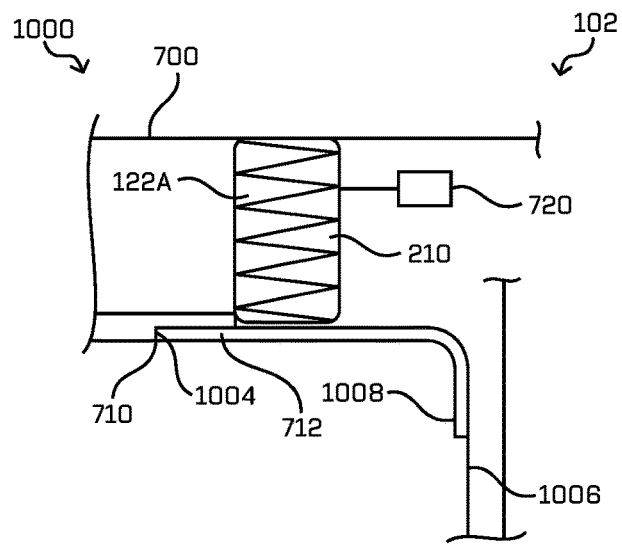
FIG. 10A is a schematic partial side section view taken along line B-B of FIG. 7 of an example side of an expandable curtain in an example stowed state covered by an example joining ceiling trim panel.
Figure 10B:
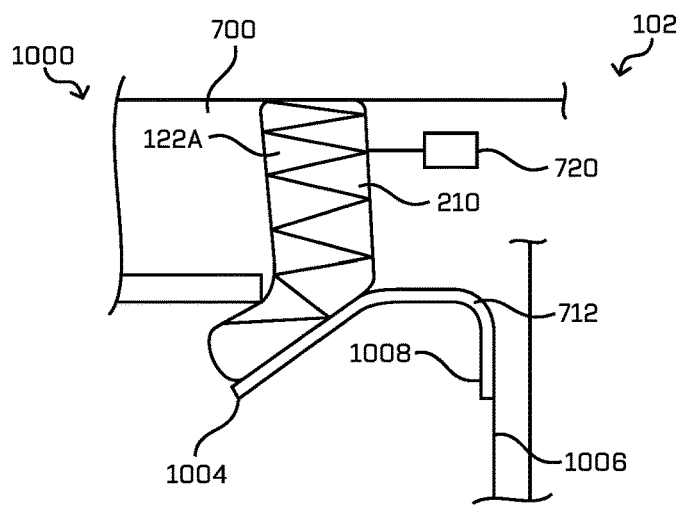
FIG. 10B is a schematic partial side section view of the examples shown in FIG. 10A showing a first instance in an example deployment sequence with the side of the expandable curtain beginning to deploy upon activation of an inflator as the example joining ceiling trim panel deflects.
Figure 10C:
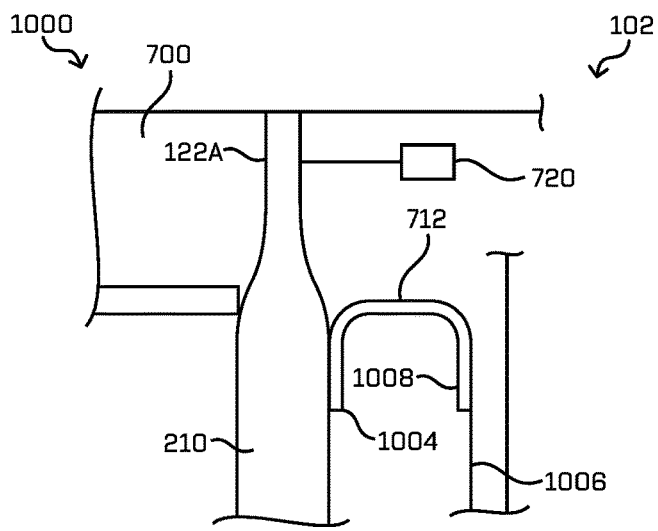
FIG. 10C is a schematic partial side section view of the examples shown in FIG. 10A showing a second instance in the example deployment sequence with the side of the expandable curtain completely deployed.

FIGS. 10A-10C schematically depict a side view of an example deployment sequence 1000 taken along line B-B of FIG. 7 as the example side 210 of the expandable curtain 122A changes from a stowed state in FIG. 10A to a deployed state in FIG. 10C. As schematically depicted in FIGS. 10A and 10B, the side 210 of the expandable curtain 122A may be stowed in a fan-folded- or accordion-like fashion to improve deployment (e.g., to increase the rate of deployment and/or to improve the completion of deployment). Other stowage arrangements are contemplated. Although only a single side 210 and associated structures are shown in FIGS. 10A-10C, one or more of the other sides 210 of the expandable curtains 122A and 122B may have the same, or similar, configuration.

As shown in FIG. 10A, the side 210 of the expandable curtain 122A is in a stowed state covered by the example joining ceiling trim panel 712. In the example shown, the joining ceiling trim panel 712 defines longitudinal seam 710 extending substantially parallel to the longitudinal axis L (see FIG. 7), and the longitudinal seam 710 is configured to create an opening through which at least a portion of the side 210 of the expandable curtain 122A passes when deploying from the stowed state to the deployed state.

For example, as shown in FIG. 10B, at an example first instance in the deployment sequence 1000, the side 210 of the expandable curtain 122A begins to deploy upon activation of the inflator 720 as the joining ceiling trim panel 712 deflects. As shown, the joining ceiling trim panel 712 defines an interior edge 1004 configured to be remote from a first side 1006 of the vehicle 102 and an exterior edge 1008 configured to be between the interior edge 1004 and the first side 1006 of the vehicle 102. In the example shown, the interior edge 1004 of the joining ceiling trim panel 712 is configured to deflect through an arc from a remaining portion of the joining ceiling trim panel 712 to a direction transverse to the ceiling 700 of the vehicle 102 along the longitudinal seam 710. When the deployment controller 126 (FIG. 7) activates the inflator 720, the side 210 of the expandable curtain 122A causes the longitudinal seam 710 to separate from ceiling 700 and/or another portion of the joining ceiling trim panel 712 and create an opening through which at least a portion of the side 210 of the expandable curtain 122A deploys.

FIG. 10C is shows a second instance in the example deployment sequence 1000 with the side 210 of the expandable curtain 122A completely deployed. As schematically shown, the joining ceiling trim panel 712 has deflected through an arc to a direction transverse to the ceiling 700 of the vehicle 102 along the longitudinal seam 710. In some examples, the opening created by deflection of the joining ceiling trim panel 712 may be contiguous with the opening created by deflection of the transverse ceiling trim panel 704.

Figure 11A:
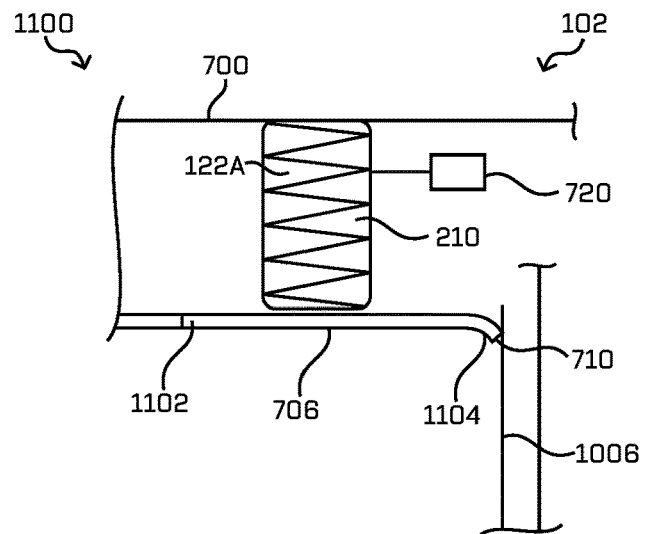
FIG. 11A is a schematic partial side section view taken along line C-C of FIG. 7 of an example side of an expandable curtain in an example stowed state covered by an example side ceiling trim panel.
Figure 11B:
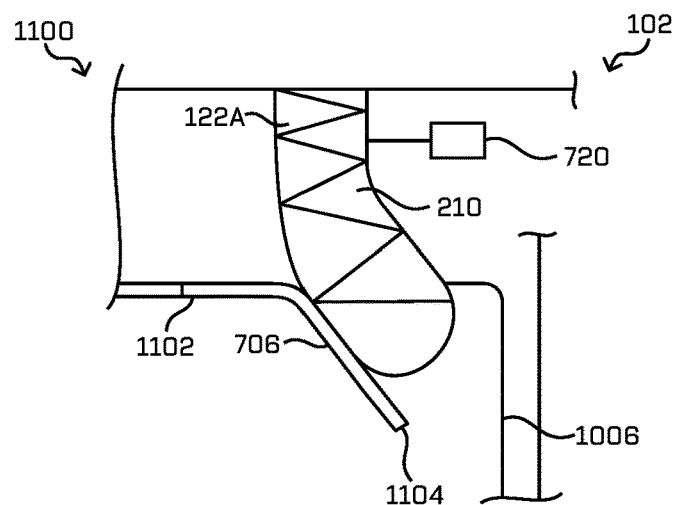
FIG. 11B is a schematic partial side section view of the examples shown in FIG. 11A showing a first instance in an example deployment sequence with the side of the expandable curtain beginning to deploy upon activation of an inflator as the example side ceiling trim panel deflects.
Figure 11C:
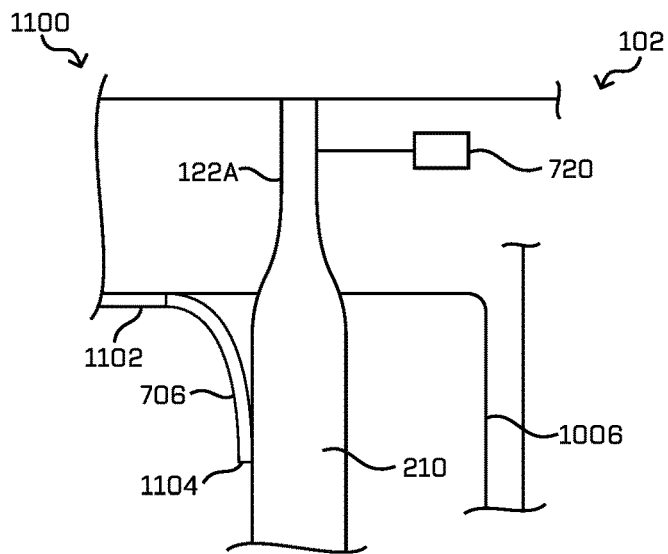
FIG. 11C is a schematic partial side section view of the examples shown in FIG. 11A showing a second instance in the example deployment sequence with the side of the expandable curtain completely deployed.

FIGS. 11A-11C schematically depict a side view of an example deployment sequence 1100 taken along line C-C of FIG. 7 of the example side 210 of the expandable curtain 122A as it changes from a stowed state in FIG. 11A to a deployed state in FIG. 11C. Although only a single side 210 of the expandable curtain 122A and associated structures are shown in FIGS. 11A-11C, one or more of the other sides 210 of the expandable curtains 122A and 122B may have the same, or similar, configuration.

As shown in FIG. 11A, the side 210 of the expandable curtain 122A is in a stowed state covered by the side ceiling trim panel 706. In the example shown, the side ceiling trim panel 706 defines longitudinal seam 710 extending substantially parallel to the longitudinal axis L (see FIG. 7), and the longitudinal seam 710 is configured to create an opening through which at least a portion of the side 210 of the expandable curtain 122A passes when deploying from the stowed state to the deployed state.

For example, as shown in FIG. 11B, at an example first instance in the deployment sequence 1100, the side 210 of the expandable curtain 122A begins to deploy upon activation of the inflator 720 as the side ceiling trim panel 706 deflects. As shown, the side ceiling trim panel 706 defines an interior edge 1102 configured to be remote from the first side 1006 of the vehicle 102 and an exterior edge 1104 configured to be between the interior edge 1102 and the first side 1006 of the vehicle 102. In the example shown, the exterior edge 1104 of the side ceiling trim panel 706 is configured to deflect through an arc from the ceiling 700 or a remaining portion of the side ceiling trim panel 706 to a direction transverse to the ceiling 700 of the vehicle 102 along the longitudinal seam 710. When the deployment controller 126 (FIG. 7) activates the inflator 720, the side 210 of the expandable curtain 122A causes the longitudinal seam 710 to separate from ceiling 700 and/or another portion of the side ceiling trim panel 706 and create an opening through which at least a portion of the side 210 of the expandable curtain 122A deploys.

FIG. 11C is shows a second instance in the example deployment sequence 1100 with the side 210 of the expandable curtain 122A completely deployed. As schematically shown, the side ceiling trim panel 706 has deflected through an arc to a direction transverse to the ceiling 700 of the vehicle 102 along the longitudinal seam 710. In some examples, the opening created by deflection of the side ceiling trim panel 706 may be contiguous with one or more of the opening created by deflection of the transverse ceiling trim panel 704 (see FIGS. 8A-8C and 9A-9C), the opening created by deflection of the joining ceiling trim panel 712 (see FIGS. 10A-10C), an opening created by deflection a second joining ceiling trim panel 712, or an opening created by a second side ceiling trim panel 706. Such a contiguous opening may be configured to permit the respective sides 204 and 210 (see FIG. 7) and the transverse portion 212 of the expandable curtain 122A (and/or the expandable curtain 122B) to deploy in a contiguous configuration (e.g., a U-shaped configuration as viewed in cross-section from above or below (see e.g., FIG. 7).

FIG. 12 shows an example architecture 1200 including an example occupant protection system 120. In the example shown, the example occupant protection system 120 includes an expandable occupant protection system 338 and a seatbelt system 340, which controls operation of systems related to the seatbelts in the vehicle 102. In the example shown, the expandable occupant protection system 338 includes one or more expandable curtain(s) 122 and one or more expandable bladder(s) 124, for example, as described herein. The expandable curtain(s) 122 may each include one or more of a first side 204, a second side 210, and a transverse portion 212 extending between the first side 204 and second side 210 and, in some examples, coupling the first and second sides 204 and 210 to one another, as explained herein. The expandable bladder(s) 124 may each include one or more of a first expandable lateral arrester 502, a second expandable lateral arrester 504, and a central expandable arrester 508, for example, as described herein.

In the example architecture 1200 shown in FIG. 12, the occupant protection system 120 also includes a deployment controller 126, which may include one or more inflators 134 (e.g., the inflators 716, 718, 720, 722, 724, 726, 728, 730, 732, and 734 shown in in FIG. 7) configured to supply fluid and/or gas to the expandable curtain(s) 122 and/or the expandable bladder(s) 124, for example, when activated by the deployment controller 126, as described herein.

In some examples, the deployment controller 126 may be configured to receive a signal indicative of a predicted collision involving the vehicle 102 and/or a collision involving the vehicle 102, and cause deployment of one or more expandable curtains 122, and/or one or more expandable bladders 124 based at least in part on the signal(s). For example, the sensor system(s) 306 of the vehicle 102 (see FIG. 3) may provide information to the perception component 322 and/or planning component 324, which may predict a collision with an object in the environment through which the vehicle 102 is travelling. The perception component 322 and/or planning component 324 may provide information to a safety system actuator 1202, which in turn, provides one or more signals to the deployment controller 126, which may activate one more inflators 134 to cause deployment of one or more expandable curtains 122 and/or one or more expandable bladders 124, for example, as described herein.

In some examples, the deployment controller 126 may be configured to receive one or more signals indicative of the presence of an occupant 104 in a first location of the vehicle 102 associated with (e.g., within an effective range of) one of the expandable bladders 124, and cause deployment of the corresponding expandable curtain 122 and/or expandable bladder 124 associated with the position of the occupant 104 based at least in part on the one or more signals. For example, the perception component 322 of the vehicle 102 may include an object classification system configured to determine information related, for example, to whether an object and/or occupant 104 is present in one or more of the respective seats 106 of the vehicle 102. In some examples, the object classification system may leverage one or more of the sensor system(s) 306 of the vehicle 102 and determine information about the object and/or occupant 104, such as, for example, the size and/or weight of the object and/or occupant 104 (e.g., whether the occupant 104 is an adult, a child, or an infant). For example, image systems (e.g., cameras) internal to the vehicle 102 may determine presence of an occupant 104 (and/or other object) in a seat 106. If no occupant 104 is present, the deployment controller 126 may receive one or more signals associated with whether an occupant 104 is in the seat 106, for example, via the safety system actuator 1202, and based at least in part on the one or more signals, determine whether to initiate deployment of, before or during a collision, the expandable curtain 122 and/or the expandable bladder 124 associated with (e.g., within an effective range of) the seat 106. For example, if an occupant 104 is not present in the seat 106, the deployment controller 126 may not initiate deployment of the expandable curtain 122 and/or the expandable bladder 124. This may prevent unnecessary deployment and prevent costs associated with servicing deployed parts of the occupant protection system 120. Alternatively, if an occupant 104 is present in the seat 106, the deployment controller 126 may initiate deployment of the expandable curtain 122 and/or the expandable bladder 124 associated with (e.g., within an effective range of) the position of the occupant 104 to protect the occupant 104 during the collision. In at least some examples, the deployment controller 126 may initiate deployment of one or more expandable curtains 122 and/or one or more expandable bladders 124, regardless of whether an occupant is present.

In some examples, the deployment controller 126 may be configured to receive one or more signals indicative of whether the occupant 104 is properly wearing a seatbelt, and cause and/or control deployment of the expandable curtain 122 and/or the expandable bladder 124 associated with the position of the occupant 104 based at least in part on the one or more signals indicative of whether the occupant 104 is properly wearing the seatbelt. For example, the sensor system(s) 306 of the vehicle 102 may determine whether the occupant 104 is properly wearing a seatbelt. The deployment controller 126 may receive one or more such signals and, based at least in part on the signals, initiate and/or control deployment of the expandable curtain 122 and/or the expandable bladder 124 before or during a collision involving the vehicle 102.

For example, if the occupant 104 is wearing a seatbelt, the deployment controller 126 may reduce the deployment rate and/or the deployment volume (or pressure) of the expandable curtain 122 and/or expandable bladder 124, for example, because the seatbelt will be expected to assist with preventing injury to the occupant 104 during the collision. If, on the other hand, the occupant 104 is not properly wearing a seatbelt, the deployment controller 126 may maintain or increase the deployment rate and/or the deployment volume (or pressure) of the expandable curtain 122 and/or expandable bladder 124, for example, because the seatbelt will not be expected to assist with preventing injury to the occupant 104 during the collision.

In some examples, deployment of one or more of the expandable curtain 122 and/or one or more of the expandable bladders 124 may be affected by a number of parameters. For example, the deployment rate, the deployment volume (and/or pressure), the timing of deployment, and/or the sequence of deployment of one or more of the expandable curtain 122 or the expandable bladders 124 may be altered based at least in part on one or more parameters, such as, for example, the severity of a collision impact, whether one or more occupants 104 is/are properly wearing a seatbelt, and/or the size and/or weight of the occupant(s) 104 (e.g., depending on whether the occupant is an adult, a child, or an infant).

In some examples, the expandable curtain 122 and one or more of the expandable bladders 124 may be deployed independently from one another. For example, the expandable curtain 122 may be deployed without deploying any of the expandable bladders 124. For example, if objects are detected in the interior 100 of the vehicle 102 and a rapid change in the speed and/or direction of travel of the vehicle 102 occurs, the expandable curtain 122 alone may be deployed to prevent objects in the vehicle 102 from being tossed around inside the vehicle 102 during the rapid change in speed and/or direction. This may be particularly useful when, for example, an occupant 104 is in a seat 106 facing a seat on which one or more objects have been placed. Upon the rapid change of speed and/or direction, the expandable curtain 122 may be deployed in order to prevent the one or more objects from being thrown from the seat opposite the occupant 104 into the occupant 104.

The deployment controller 126, in some examples, may be configured to receive one or more signals indicative of a direction of travel of the vehicle 102, and cause deployment of the expandable curtain 122 and/or the expandable bladder 124 based at least in part on the one or more signals indicative of the direction of travel of the vehicle 102. For example, the vehicle 102 may be a bi-directional vehicle configured to travel between locations with either end of the vehicle 102 being the leading end, for example, as described herein with respect to FIG. 1. In such vehicles, a seat 106 may be facing the direction of travel when the vehicle 102 is traveling with one end of the vehicle being the leading end, but with the seat 106 facing rearward with the other end of the vehicle 102 being the leading end. The vehicle 102 may include sensors and/or a system configured to generate one or more signals indicative of whether the vehicle 102 is traveling in a direction such that the seat 106 is facing forward (i.e., along a direction of travel) or the seat 106 is facing rearward (i.e., opposing a direction of travel). The deployment controller 126 may be configured to prevent deployment of the expandable curtain 122 and/or the expandable bladder 124 associated with the seat 106, even when occupied, for example, when the seat 106 is facing rearward based at least in part on the signals. This may prevent unnecessary deployment and costs associated with servicing deployed parts of the occupant protection system 120. Alternatively, if the seat 106 is facing forward, the deployment controller 126 may initiate deployment of the expandable curtain 122 and/or the expandable bladder 124 associated with the position of the seat 106 to protect the occupant 104 during the collision, for example, as described herein.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Those skilled in the art will appreciate that the example architectures 300 and 1200 are merely illustrative and are not intended to limit the scope of the present disclosure. In particular, the computing system and devices may include any combination of hardware or software that can perform the indicated functions, including computers, network devices, internet appliances, tablet computers, PDAs, wireless phones, pagers, etc. The architectures 300 and 1200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated architectures 300 and 1200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the architectures 300 and 1200 may be transmitted to the architectures 300 and 1200 via transmission media or signals such as electrical, electromagnetic, or digital signals, conveyed via a communication medium such as a wireless link. Various implementations may further include receiving, sending, or storing instructions and/or data implemented in accordance with the foregoing description on a computer-accessible medium.

Accordingly, the techniques described herein may be practiced with other control system configurations. Additional information about the operations of the modules of the vehicle 102 is discussed below.

Figure 13:
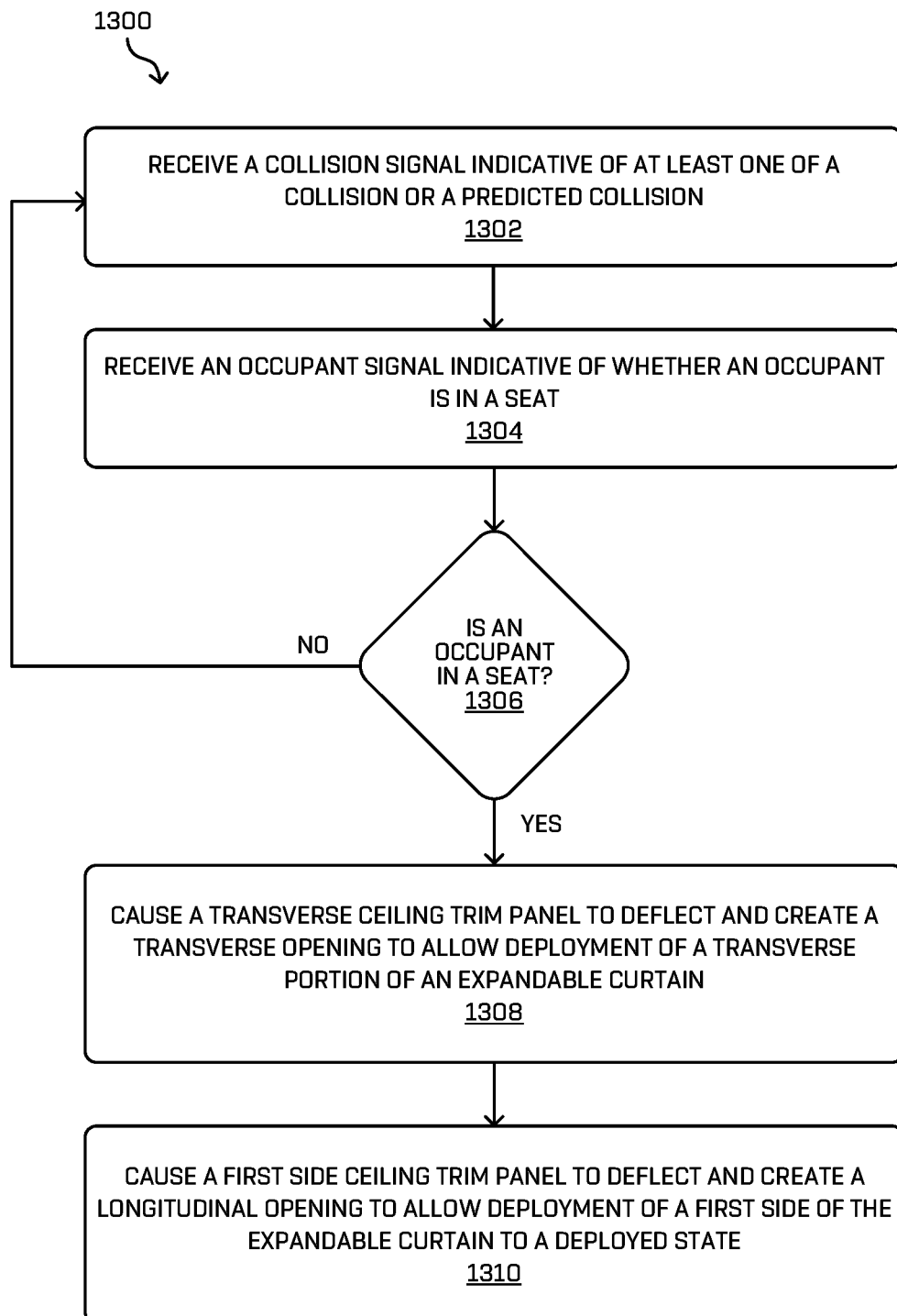
FIG. 13 is a flow diagram of an example process for deploying an expandable occupant protection system relative to ceiling trim panels.
Figure 14:
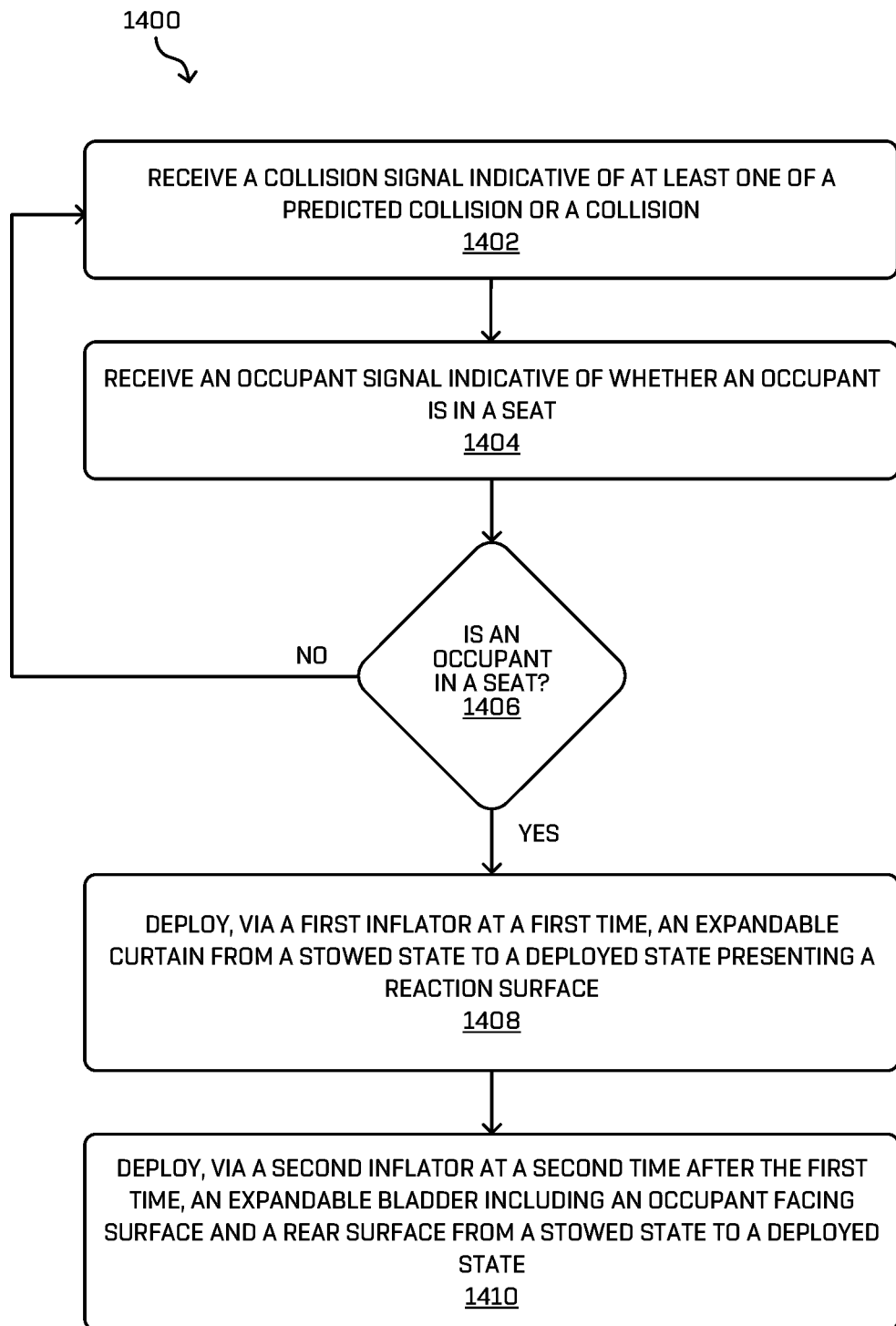
FIG. 14 is a flow diagram of an example process for deploying an expandable occupant protection system using inflators.

FIGS. 13 and 14 are flow diagrams of example processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 13 is a flow diagram of an example process 1300 for deploying an expandable occupant protection system. At 1302, the example process 1300 may include receiving a collision signal indicative of at least one of a collision or a predicted collision, for example, involving another vehicle or an object. In some examples, collision signals may be generated by, for example, the perception and/or planning components and may be received by a deployment controller, for example, as described herein.

At 1304, the example process 1300 may include receiving an occupant signal indicative of whether an occupant (and/or object) is present in a seat of the vehicle. For example, an object classification system and/or other portions of vehicle systems may generate signals indicative of whether an occupant is present in a seat of the vehicle, and in some examples, one or more signals indicative of the seat in which the occupant is seated. In some examples, such signals may be received by the deployment controller, for example, as described herein.

At 1306, the example process 1300 may include determining, based at least partially on the occupant signal, whether there is an occupant present in a seat. If not, the example process 1300 may return to 1302 without activating an occupant protection system, including an expandable occupant protection system.

On the other hand, if there is an occupant present in a seat of the vehicle, the example process 1300 may include at 1308 causing a transverse ceiling trim panel to deflect and create a transverse opening to allow deployment of a transverse portion of an expandable curtain, for example, as described herein. In some examples, this may include a deployment controller activating an inflator in flow communication with the transverse portion of the expandable curtain. In some examples, activation of the inflator may cause the transverse portion of the expandable curtain to begin deployment, which may provide a force against the transverse ceiling trim panel sufficient to cause a transverse seam associated with the transverse ceiling trim panel to open, thereby permitting deployment of the transverse portion of the expandable curtain through the opening created and ultimately achieve its deployed state.

At 1310, some examples of the process 1300 may include causing a first side ceiling trim panel to deflect and create a longitudinal opening to allow deployment of a first side of the expandable curtain to a deployed state, for example, as described herein. In some examples, this may include the deployment controller activating an inflator in flow communication with the first side of the expandable curtain. In some examples, activation of the inflator may cause the first side of the expandable curtain to begin deployment, which may provide a force against the first side ceiling trim panel sufficient to cause a longitudinal seam associated with the first side ceiling trim panel to open, thereby permitting deployment of at least a portion of the first side of the expandable curtain through the opening created and ultimately achieve its deployed state.

In some examples, 1308 and 1310 may occur concurrently (e.g., substantially simultaneously). In some examples, the process may also include causing a second side ceiling trim panel to deflect and create a longitudinal opening to allow deployment of a second side of the expandable curtain to a deployed state, for example, as described herein. In some examples, this may include the deployment controller activating an inflator in flow communication with the second side of the expandable curtain. In some examples, activation of the inflator may cause the second side of the expandable curtain to begin deployment, which may provide a force against the second side ceiling trim panel sufficient to cause a longitudinal seam associated with the second side ceiling trim panel to open, thereby permitting deployment of at least a portion of the second side of the expandable curtain through the opening created and ultimately achieve its deployed state. In some examples, activation of the inflator associated with the second side of the expandable curtain may occur concurrently with 1308 and 1310, for example as described herein. In some examples, the process 1300 may also include activating one or more inflators in flow communication with respective expandable bladders, for example, as described herein.

FIG. 14 is a flow diagram of an example process 1400 for deploying an expandable occupant protection system. At 1402, the example process 1400 may include receiving a collision signal indicative of at least one of a collision or a predicted collision, for example, involving another vehicle or an object. In some examples, collision signals may be generated by, for example, the perception and/or planning components and may be received by a deployment controller, for example, as described herein.

At 1404, the example process 1400 may include receiving an occupant signal indicative of whether an occupant and/or object is present in a seat of the vehicle. For example, an object classification system and/or other portions of vehicle systems may generate signals indicative of whether an occupant and/or object is present in a seat of the vehicle, and in some examples, one or more signals indicative of the seat in which the occupant is seated or object is located. In some examples, such signals may be received by the deployment controller, for example, as described herein.

At 1406, the example process 1400 may include determining, based at least partially on the occupant signal, whether there is an occupant and/or object present in a seat. If not, the example process 1400 may return to 1402 without activating an occupant protection system, including an expandable occupant protection system.

On the other hand, if there is an occupant and/or object present in a seat of the vehicle, the example process 1400 may include at 1408 deploying, via a first inflator at a first time, an expandable curtain from a stowed state to a deployed state presenting a reaction surface. In some examples, the expandable curtain may include a transverse portion presenting the reaction surface and a first side orthogonal with respect to the transverse portion and extending in a direction substantially parallel with respect to a longitudinal axis of the vehicle. In some such examples, at 1408, the process 1400 may include deploying, via the first inflator at the first time, the transverse portion of the expandable curtain, and deploying, via the first inflator and/or a second inflator at the first time, the first side of the expandable curtain from a stowed state to a deployed state. In some examples, the expandable curtain may include a second side spaced from and opposite the first side of the expandable curtain. In some such examples, at 1408, the process 1400 may include deploying, via the first inflator at the first time, the transverse portion of the expandable curtain, deploying, via the first inflator and/or a second inflator at the first time, the first side of the expandable curtain from a stowed state to a deployed state, and deploying, via the first inflator, the second inflator, and/or a third inflator at the first time, the second side of the expandable curtain from a stowed state to a deployed state. In some such examples, the first side, the second side, and the transverse portion of the expandable curtain may provide a contiguous barrier.

In some examples, the occupant protection system may include a second expandable curtain, for example, as described herein. In some such examples, the process 1400, at 1408, may include deploying, via one or more inflators (e.g., the first, second, and/or third inflators) at the first time, the second expandable curtain from a stowed state to a deployed state presenting a second reaction surface. Some such examples of the process 1400 may include deploying a first side, a transverse portion, and/or a second side of the second expandable curtain, for example, in a manner at least similar to the manner in which the first expandable curtain may be deployed.

At 1410, the example process 1400 may include deploying, via a second inflator at a second time after the first time, an expandable bladder including an occupant facing surface and a rear surface opposite the occupant facing surface from a stowed state to a deployed state, such that the rear surface of the expandable bladder contacts the reaction surface of the expandable curtain. In some examples, the deployment controller may be in communication with the fourth inflator and activate the fourth inflator. For example, the deployment controller may be configured to activate the fourth inflator in flow communication with expandable bladder and may activate the expandable bladder after deployment of the expandable curtain following a time delay (e.g., a time delay of about 500 milliseconds or less, a time delay of about 250 milliseconds or less, a time delay of about 100 milliseconds or less, a time delay of about 50 milliseconds or less, a time delay of about 25 milliseconds or less, or a time delay of about 5 milliseconds or less). In some examples, the occupant protection system may include more than one expandable bladder. For example, the occupant protection system may include an expandable bladder corresponding to one or more seats in the vehicle, for example, each seat of the vehicle. In some such examples, at 1410, the process 1400 may include deploying via the fourth inflator and/or one or more additional inflators (e.g., an inflator for each of the expandable bladders) at the second time after the first time, one or more of the additional expandable bladders, each including an occupant facing surface and a rear surface opposite the occupant facing surface, from a stowed state to a deployed state, such that the respective rear surfaces of the expandable bladders contact the reaction surface of the expandable curtain. In examples including a second expandable curtain, the process 1400, at 1410, may also include deploying one or more additional expandable bladders at the second time, such that the respective rear surfaces of the additional expandable bladders contact the reaction surface of the second expandable curtain.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Based on the foregoing, it should be appreciated that technologies for deploying an occupant protection system have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

EXAMPLE CLAUSES

An example occupant protection system for a vehicle, the occupant protection system comprising:
  an expandable curtain configured to expand from a stowed state to a deployed state, wherein the expandable curtain in the deployed state comprises:
    a first side configured to extend along a portion of a first interior side of the vehicle in a first direction;
    a second side spaced from the first side and configured to extend in a direction substantially parallel to the first direction; and
    a transverse portion extending in a second direction transverse to the first direction, the transverse portion providing a reaction surface, wherein the first side, the transverse portion, and the second side of the expandable curtain form a contiguous barrier;
  an expandable bladder comprising an occupant facing surface and a rear surface opposite the occupant facing surface, the expandable bladder configured to expand from a stowed state to a deployed state, such that in the deployed state the rear surface of the expandable bladder contacts the reaction surface of the transverse portion of the expandable curtain;
  a transverse ceiling trim panel configured to be coupled to a ceiling of the vehicle and extending substantially parallel to the second direction, the transverse ceiling trim panel configured to cover the transverse portion of the expandable curtain in the stowed state and to deflect to allow expansion of the transverse portion to the deployed state; and
  a side ceiling trim panel configured to be coupled to the ceiling of the vehicle and extending substantially parallel to the first direction, the side ceiling trim panel configured to cover the side of the expandable curtain in the stowed state and to deflect to allow expansion of the first side of the expandable curtain to the deployed state.

B. The occupant protection system of example A, wherein the transverse ceiling trim panel comprises a transverse seam extending substantially parallel to the second direction, and wherein the transverse seam is configured to create a transverse opening through which the transverse portion of the expandable curtain passes when expanding from the stowed state to the deployed state.

C. The occupant protection system of example A or example B, wherein the side ceiling trim panel comprises a longitudinal seam extending substantially parallel to the first direction, and wherein the longitudinal seam is configured to create a longitudinal opening through which the first side of the expandable curtain passes when expanding from the stowed state to the deployed state.

D. The occupant protection system of any one of example A through example C, wherein the transverse ceiling trim panel and the side ceiling trim panel are configured to create a contiguous opening through which the transverse portion and the first side pass when expanding from the stowed state to the deployed state.

E. The occupant protection system of any one of example A through example D, wherein at least a portion of the transverse ceiling trim panel proximate the transverse seam is configured to deflect through an arc away from the ceiling of the vehicle.

F. The occupant protection system of any one of example A through example E, wherein at least a portion of the side ceiling trim panel proximate the longitudinal seam is configured to deflect through an arc away from the ceiling of the vehicle.

G. An example ceiling trim panel system for a vehicle, the ceiling trim panel system comprising:

a transverse ceiling trim panel configured to be coupled to a ceiling of the vehicle and extend in a first direction substantially transverse relative to a longitudinal axis of the vehicle, the transverse ceiling trim panel configured to cover a transverse portion of an expandable curtain in a stowed state and to deflect to allow deployment of the transverse portion of the expandable curtain to a deployed state.

H. The ceiling trim panel system of example G, further comprising a first side ceiling trim panel configured to be coupled to the ceiling of the vehicle and extend in a second direction substantially parallel to the longitudinal axis of the vehicle, the first side ceiling trim panel configured to cover a first side of the expandable curtain in the stowed state and to deflect to allow deployment of the first side of the expandable curtain to a deployed state.

I. The ceiling trim panel system of example G or example H, wherein the transverse ceiling trim panel comprises a transverse seam extending substantially parallel to the first direction, and wherein the transverse seam is configured to create an opening through which the transverse portion of the expandable curtain passes when deploying from the stowed state to the deployed state.

J. The ceiling trim panel system of any one of example G through example I, wherein the first side ceiling trim panel comprises longitudinal seam extending substantially parallel to the second direction, and wherein the longitudinal seam is configured to create an opening through which the first side of the expandable curtain passes when deploying from the stowed state to the deployed state.

K. The ceiling trim panel system of any one of example G through example J, wherein the transverse ceiling trim panel and the first side ceiling trim panel are configured to create a contiguous opening through which the transverse portion and the first side pass when deploying from the stowed state to the deployed state.

L. The ceiling trim panel system of any one of example G through example K, wherein at least a portion of the transverse ceiling trim panel proximate the transverse seam is configured to deflect through an arc away from the ceiling of the vehicle.

M. The ceiling trim panel system of any one of example G through example L, wherein at least a portion of the first side ceiling trim panel proximate the longitudinal seam is configured to deflect through an arc from a portion of the first side ceiling trim panel to a position transverse to the ceiling of the vehicle.

N. The ceiling trim panel system of any one of example G through example M, further comprising a joining ceiling trim panel associated with the transverse ceiling trim panel and the first side ceiling trim panel, the joining ceiling trim panel configured to be coupled to the ceiling of the vehicle and cover a portion of one or more of the transverse portion of the expandable curtain or the first side of the expandable curtain in the stowed state and to deflect to allow deployment of one or more of the transverse portion or the first side of the expandable curtain to a deployed state.

O. The ceiling trim panel system of any one of example G through example N, further comprising a second side ceiling trim panel spaced from the first side ceiling trim panel and configured to be coupled to the ceiling of the vehicle and extend substantially parallel to the second direction, the second side ceiling trim panel configured to cover a second side of the expandable curtain in the stowed state and to deflect to allow deployment of the second side to a deployed state.

P. The ceiling trim panel system of any one of example G through example O, wherein the second side ceiling trim panel comprises second longitudinal seam extending substantially parallel to the second direction, and wherein the second longitudinal seam is configured to create an opening through which the second side of the expandable curtain passes when deploying from the stowed state to the deployed state.

Q. An example method of creating an opening through which an expandable curtain deploys from a stowed state to a deployed state, the method comprising:

providing a transverse ceiling trim panel coupled to a ceiling of the vehicle and extending in a first direction substantially transverse relative to a longitudinal axis of the vehicle, the transverse ceiling trim panel covering a transverse portion of an expandable curtain in a stowed state;

providing a first side ceiling trim panel coupled to the ceiling of the vehicle and extending in a second direction substantially parallel to the longitudinal axis of the vehicle, the first side ceiling trim panel covering a first side of the expandable curtain in a stowed state;

causing the transverse ceiling trim panel to deflect and create a transverse opening to allow deployment of the transverse portion of the expandable curtain to a deployed state; and causing the first side ceiling trim panel to deflect and create a longitudinal opening to allow deployment of the first side of the expandable curtain to a deployed state.

R. The method of example Q, wherein causing the transverse ceiling trim panel to deflect and causing the first side ceiling trim to deflect occur concurrently.

S. The method of example Q or example R, wherein the transverse opening and the longitudinal opening are contiguous.

T. The method of any one of example Q through example S, wherein:

causing the transverse ceiling trim panel to deflect comprises causing a transverse seam defined by the transverse ceiling trim panel to open and create the transverse opening; and causing the first side ceiling trim panel to deflect comprises causing a longitudinal seam defined by the first side ceiling trim panel to open and create the longitudinal opening.

U. An example occupant protection system for a vehicle, the occupant protection system comprising:

an expandable curtain configured to expand from a stowed state to a deployed state, wherein the expandable curtain in the deployed state comprises:

a first side configured to extend along a portion of a first interior side of the vehicle in a first direction; and a transverse portion extending in a second direction transverse to the first direction, the transverse portion providing a reaction surface, wherein the first side and the transverse portion of the expandable curtain form a contiguous barrier;

an expandable bladder comprising an occupant facing surface and a rear surface opposite the occupant facing surface, the expandable bladder configured to expand from a stowed state to a deployed state, such that in the deployed state the rear surface of the expandable bladder contacts the reaction surface of the transverse portion of the expandable curtain;

a first inflator in flow communication with the expandable curtain and configured, upon activation of the first inflator, to cause the expandable curtain to expand from the stowed state to the deployed state;

a second inflator in flow communication with the expandable bladder and configured, upon activation of the second inflator, to cause the expandable bladder to expand from the stowed state to the deployed state; and a deployment controller in communication with the first inflator and the second inflator, and configured to activate the first inflator and the second inflator.

V. The occupant protection system of example U, wherein the deployment controller is configured to activate the first inflator prior to activation of the second inflator.

W. The occupant protection system of example U or example V, wherein activation of the first inflator is configured to separate at least a portion of a trim panel from the ceiling of the vehicle and to create an opening though which the expandable curtain and the expandable bladder expand.

X. The occupant protection system of any one of example U through example W, wherein at least a portion of the expandable bladder is coupled to at least a portion of the expandable curtain.

Y. The occupant protection system of any one of example U through example X, wherein in the deployed state, the expandable curtain comprises a distal curtain end, and the expandable bladder in the deployed state comprises a distal bladder end, wherein the occupant protection system further comprises a tether coupling the distal curtain end and the distal bladder end.

Z. An example deployment system for an occupant protection system, the deployment system comprising:

a deployment controller configured to activate an inflator in flow communication with one or more of an expandable curtain or an expandable bladder;

a first inflator in flow communication with one or more of the expandable curtain or the expandable bladder and configured to cause, upon activation of the first inflator by the deployment controller, one or more of the expandable curtain or the expandable bladder to deploy from a stowed state to a deployed state.

AA. The deployment system of example Z, further comprising a second inflator in flow communication with the expandable bladder and configured to cause, upon activation of the second inflator by the deployment controller, the expandable bladder to deploy from a stowed state to a deployed state, wherein the deployment controller is configured to activate the first inflator prior to activating the second inflator.

BB. The deployment system of example Z or example AA, further comprising a third inflator in flow communication with the expandable curtain and configured to cause, upon activation of the third inflator by the deployment controller, a first portion of the expandable curtain to deploy from a stowed state to a deployed state.

CC. The deployment system of any one of example Z through example BB, wherein the deployment controller is configured to activate the first inflator and the third inflator concurrently.

DD. The deployment system of any one of example Z through example CC, wherein:

the first inflator has a first deployment pressure, a first deployment volume, and a first deployment flow rate;

the second inflator has a second deployment pressure, a second deployment volume, and a second deployment flow rate; and at least one of:

the first deployment pressure differs from the second deployment pressure;

the first deployment volume differs from the second deployment volume; or the first deployment flow rate differs from the second deployment flow rate.

EE. The deployment system of any one of example Z through example DD, wherein the expandable bladder comprises a first expandable bladder and the deployment system further comprises a third inflator in flow communication with a second expandable bladder and configured to cause, upon activation of the third inflator by the deployment controller, the second expandable bladder to deploy from a stowed state to a deployed state.

FF. The deployment system of any one of example Z through example EE, wherein the deployment controller is configured to activate the second inflator and the third inflator concurrently.

GG. The deployment system of any one of example Z through example FF, wherein the expandable curtain comprises a first expandable curtain and the deployment system further comprises a third inflator in flow communication with a second expandable curtain and configured, upon activation of the third inflator by the deployment controller, to cause the second expandable curtain to deploy from a stowed state to a deployed state.

HH. The deployment system of any one of example Z through example GG, wherein the deployment controller is configured to activate the first inflator and the third inflator concurrently.

II. The deployment system of any one of example Z through example HH, wherein in the deployed state, the first expandable curtain comprises a first distal curtain end, and the second expandable curtain in the deployed state comprises a second distal curtain end, and wherein the deployment system further comprises a tether coupling the first distal curtain end and the second distal curtain end to one another.

JJ. The deployment system of any one of example Z through example II, wherein the deployment controller is configured to:
  receive a signal indicative of a presence of one or more of an occupant or an object in a seat; and
  activate, based at least in part on the signal, the first inflator to deploy one or more of an expandable curtain or an expandable bladder associated with the seat.

KK. An example method for deploying an occupant protection system from a stowed state to a deployed state, the method comprising:
  deploying, via a first inflator at a first time, an expandable curtain from a stowed state to a deployed state presenting a reaction surface; and
  deploying, via a second inflator at a second time after the first time, an expandable bladder comprising an occupant facing surface and a rear surface opposite the occupant facing surface from a stowed state to a deployed state, such that the rear surface of the expandable bladder contacts the reaction surface of the expandable curtain.

LL. The method of example KK, wherein:
  the first inflator has a first deployment pressure, a first deployment volume, and a first deployment flow rate;
  the second inflator has a second deployment pressure, a second deployment volume, and a second deployment flow rate; and
  at least one of:
    the first deployment pressure differs from the second deployment pressure;
    the first deployment volume differs from the second deployment volume; or
    the first deployment flow rate differs from the second deployment flow rate.

MM. The method of example KK or example LL, wherein the expandable bladder comprises a first expandable bladder and the method further comprises deploying, via a third inflator at the second time, a second expandable bladder comprising a second occupant facing surface and a second rear surface opposite the second occupant facing surface from a stowed state to a deployed state, such that the second rear surface of the second expandable bladder contacts the reaction surface of the expandable curtain.

NN. The method of any one of example KK through example MM, wherein the occupant protection system comprises at least one additional expandable curtain and at least one additional expandable bladder, and the method further comprises deploying, via at least one additional inflator, at least one of the at least one additional expandable curtain or the at least one expandable bladder.

What is claimed is:

1. An occupant protection system for a vehicle, the occupant protection system comprising:
  an expandable curtain configured to expand from a stowed state to a deployed state, wherein the expandable curtain in the deployed state comprises:
    a side configured to extend along a portion of a first interior side of the vehicle in a first direction; and
    a transverse portion extending in a second direction transverse to the first direction wherein the side and the transverse portion of the expandable curtain form a contiguous barrier; and
  a trim panel defining an opening through which the expandable curtain expands to the deployed state;
  wherein at least a portion of the trim panel is proximate a transverse seam extending substantially parallel to the second direction, and wherein the transverse seam is configured to create a transverse opening through which the transverse portion of the expandable curtain passes when expanding from the stowed state to the deployed state; and
  wherein the trim panel is coupled to a body of the vehicle and at least a portion of the trim panel proximate the transverse seam is configured to deflect through an arc away from a side of the vehicle when the expandable curtain deploys.

2. The occupant protection system of claim 1, further comprising an inflator in flow communication with the expandable curtain and a deployment controller communicatively coupled to the inflator and configured to activate the inflator to inflate the expandable curtain in response to detecting a collision or a predicted collision.

3. The occupant protection system of claim 1, further comprising an expandable bladder disposed behind the trim panel or another trim panel and configured to expand from a stowed state to a deployed state, wherein at least a portion of the expandable curtain is physically coupled to at least a portion of the expandable bladder.

4. The occupant protection system of claim 3, wherein:
  in the deployed state, the expandable curtain comprises a distal curtain end, and the expandable bladder in the deployed state comprises a distal bladder end, and
  the occupant protection system further comprises a tether coupling the distal curtain end and the distal bladder end.

5. The occupant protection system of claim 1, further comprising an inflator in flow communication with the expandable curtain, wherein the inflator is configured, upon activation, to cause the expandable curtain to expand from the stowed state creating the opening in the trim panel.

6. A vehicle comprising:
  a trim panel disposed in a passenger compartment of the vehicle; and
  an expandable curtain configured to be inflated from a stowed state to a deployed state, wherein during inflation the expandable curtain is configured to expand through an opening in the trim panel, wherein the expandable curtain in the deployed state comprises:
    a side configured to extend along a portion of a first interior side of the vehicle in a first direction; and
    a transverse portion extending in a second direction transverse to the first direction wherein the side and the transverse portion of the expandable curtain form a contiguous barrier in the deployed state;
  wherein at least a portion of the trim panel is proximate a transverse seam extending substantially parallel to the second direction, and wherein the transverse seam is configured to create a transverse opening through which the transverse portion of the expandable curtain passes when expanding from the stowed state to the deployed state; and
  wherein the trim panel is coupled to a body of the vehicle and at least a portion of the trim panel proximate the transverse seam is configured to deflect through an arc away from a side of the vehicle when the expandable curtain deploys.

7. The vehicle of claim 6, further comprising:
  an inflator in flow communication with the expandable curtain; and
  a deployment controller, the deployment controller configured to:
    receive a signal indicative of a presence of one or more of an occupant or an object in a seat; and
    activate, based at least in part on the signal, the inflator to deploy the expandable curtain.

8. The vehicle of claim 6, further comprising an expandable bladder configured to be actuated from a stowed state to a deployed state, wherein at least a portion of the expandable curtain is coupled to the expandable bladder.

9. The vehicle of claim 8, wherein the expandable bladder comprises a first expandable bladder and the vehicle further comprises a second inflator in flow communication with a second expandable bladder and configured to cause, upon activation of the second inflator by a deployment controller, the second expandable bladder to deploy from a stowed state to a deployed state.

10. The vehicle of claim 8, wherein in the deployed state, the expandable curtain comprises a distal curtain end, and the expandable bladder in the deployed state comprises a distal bladder end, and wherein the vehicle further comprises a tether coupling the distal curtain end and the distal bladder end to one another.

11. The vehicle of claim 6, wherein the expandable curtain is configured to create the opening in the trim panel during expansion of the expandable curtain.

12. The vehicle of claim 6, wherein:
the expandable curtain is a first expandable curtain, the side is a first side, the transverse portion is a second transverse portion, and the contiguous barrier is a first contiguous barrier; and
the vehicle further comprises a second expandable curtain stowed beneath the trim panel or another trim panel and configured to be inflated to a deployed state, wherein the second expandable curtain in the deployed state comprises:
a second side configured to extend in a third direction opposite the first direction; and
the second transverse portion extending in a fourth direction transverse to the third direction wherein the second side and the second transverse portion of the second expandable curtain form a second contiguous barrier in the deployed state.

13. The vehicle of claim 12, wherein the first expandable curtain faces a first longitudinal end of the passenger compartment of the vehicle and the second expandable curtain faces a second longitudinal end of the passenger compartment.

14. A method of deploying an occupant protection system from a stowed state to a deployed state, the method comprising:
deploying, via an inflator in flow communication with an expandable curtain, the expandable curtain from a stowed state disposed beneath a trim panel of a vehicle to a deployed state; and
separating, via deployment of the expandable curtain, the trim panel of the vehicle to create an opening through which the expandable curtain and an expandable bladder can expand, wherein the expandable curtain in the deployed state comprises:
a side configured to extend along a portion of a first interior side of the vehicle in a first direction; and
a transverse portion extending in a second direction transverse to the first direction wherein the side and the transverse portion of the expandable curtain form a contiguous barrier.

15. The method of claim 14, wherein at least a portion of the expandable curtain is coupled to at least a portion of the expandable bladder.

16. The method of claim 14, wherein at least a portion of the trim panel is proximate a transverse seam extending substantially parallel to the second direction, and wherein the transverse seam is configured to create a transverse opening through which the transverse portion of the expandable curtain passes when expanding from the stowed state to the deployed state.

17. The method of claim 14, wherein the expandable curtain is arranged in an accordion-like fashion when in the stowed state.

18. The method of claim 14, wherein the occupant protection system further comprises an additional expandable curtain and an additional expandable bladder, and the method further comprises deploying, via the inflator or an additional inflator, at least one of the additional expandable curtain or the additional expandable bladder.

\* \* \* \* \*